(12) United States Patent
Iwai et al.

(10) Patent No.: US 9,544,460 B2
(45) Date of Patent: Jan. 10, 2017

(54) WORKFLOW SYSTEM, WORKFLOW EXECUTING DEVICE, WORKFLOW EXECUTING METHOD, AND NON-TRANSITORY COMPUTER-READABLE RECORDING MEDIUM ENCODED WITH WORKFLOW EXECUTING PROGRAM

(71) Applicant: Konica Minolta, Inc., Chiyoda-ku, Tokyo (JP)

(72) Inventors: Hidetaka Iwai, Itami (JP); Junichi Hase, Osaka (JP); Nobuhiro Mishima, Osaka (JP); Hirokazu Kubota, Otsu (JP); Daisuke Nakano, Kobe (JP); Yuji Okamoto, Nishinomiya (JP); Hideaki Soejima, Amagasaki (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/798,791

(22) Filed: Jul. 14, 2015

(65) Prior Publication Data
US 2016/0014293 A1    Jan. 14, 2016

(30) Foreign Application Priority Data
Jul. 14, 2014    (JP) ................................ 2014-144128

(51) Int. Cl.
H04N 1/00    (2006.01)
(52) U.S. Cl.
CPC ................................ *H04N 1/00949* (2013.01)

(58) Field of Classification Search
USPC ............ 358/1.15, 1.14, 1.13, 468, 400, 401; 348/135
See application file for complete search history.

(56) References Cited

U.S. PATENT DOCUMENTS

| | | | |
|---|---|---|---|
| 8,646,060 B1* | 2/2014 | Ben Ayed | H04L 63/0853 726/9 |
| 9,004,353 B1* | 4/2015 | Block | G06Q 20/1085 235/379 |
| 9,264,419 B1* | 2/2016 | Johansson | H04L 63/08 |

(Continued)

FOREIGN PATENT DOCUMENTS

JP    2012-243203 A    12/2012

*Primary Examiner* — Jerome Grant, II
(74) *Attorney, Agent, or Firm* — Buchanan Ingersoll & Rooney PC

(57) ABSTRACT

A workflow executing device executes the steps of: specifying a workflow; executing processes defined by the specified workflow; specifying an external process to be processed by a first external device from among the processes; specifying a device that stores account information requested by the first external device as a second external device in order to allow the first external device to execute the external process; generating a sub-workflow that defines a login process of logging into the first external device, a request process of allowing the first external device to execute the external process, and an execution result output process of transmitting the execution result to the workflow executing device; and changing the external process in the workflow to a workflow transmitting process of transmitting the sub-workflow to the second external device and an execution result receiving process of receiving the execution result from the second external device.

22 Claims, 10 Drawing Sheets

(56) References Cited

U.S. PATENT DOCUMENTS

| | | | |
|---|---|---|---|
| 2003/0130957 A1* | 7/2003 | Best | G06F 21/41 |
| | | | 705/72 |
| 2004/0034550 A1* | 2/2004 | Menschik | G06F 19/322 |
| | | | 705/3 |
| 2008/0307089 A1* | 12/2008 | Sullivan | H04L 41/06 |
| | | | 709/224 |
| 2010/0185858 A1* | 7/2010 | Nishimi | H04L 63/08 |
| | | | 713/168 |
| 2010/0262965 A1* | 10/2010 | Miyata | G06F 3/1204 |
| | | | 718/100 |
| 2011/0145056 A1* | 6/2011 | Sullivan | G06Q 30/02 |
| | | | 705/14.41 |
| 2012/0075464 A1* | 3/2012 | Derenne | A61B 5/0013 |
| | | | 348/135 |
| 2012/0300253 A1 | 11/2012 | Omori | |
| 2014/0223185 A1* | 8/2014 | Bender | G06F 21/42 |
| | | | 713/176 |
| 2016/0021076 A1* | 1/2016 | Lin | H04L 63/0435 |
| | | | 713/171 |
| 2016/0021485 A1* | 1/2016 | Sallas | H04W 4/008 |
| | | | 455/41.3 |

* cited by examiner

F I G. 7
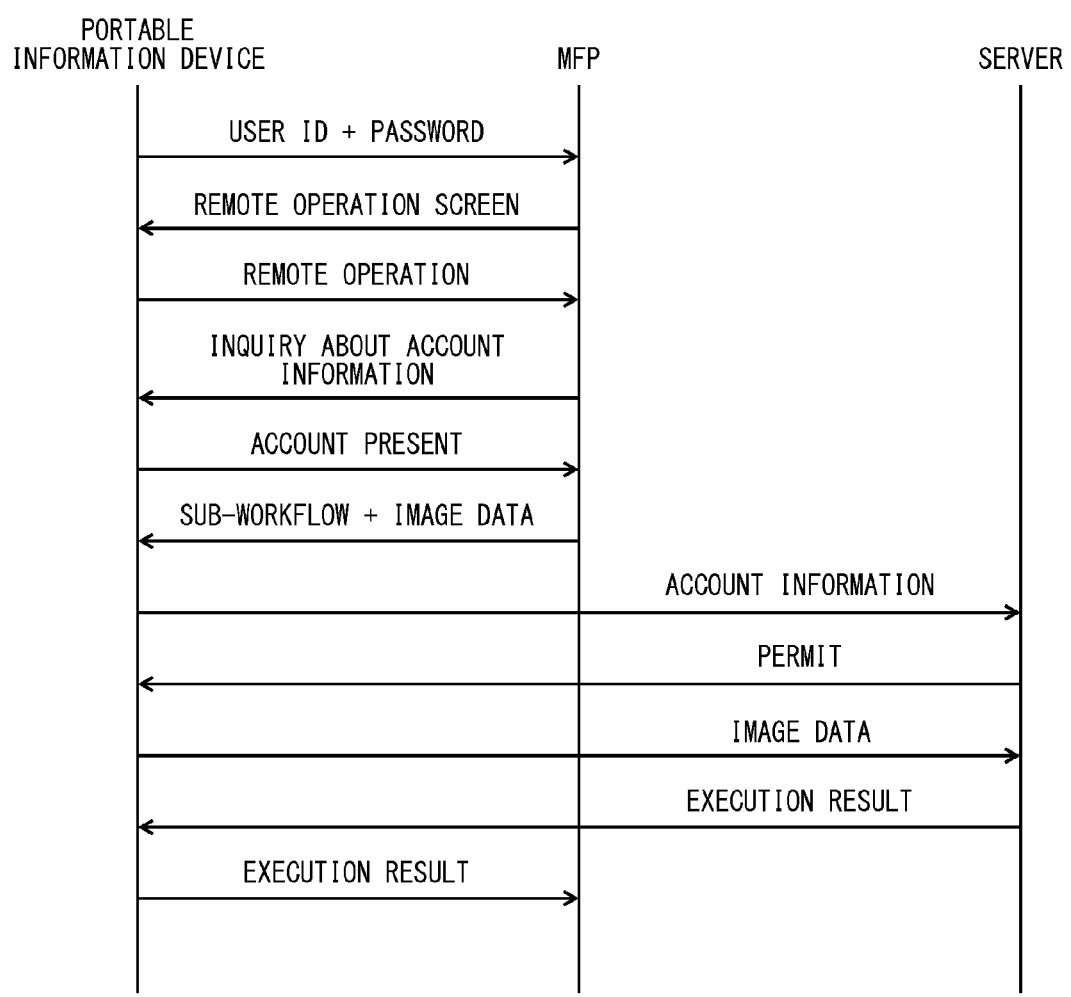

WORKFLOW SYSTEM, WORKFLOW EXECUTING DEVICE, WORKFLOW EXECUTING METHOD, AND NON-TRANSITORY COMPUTER-READABLE RECORDING MEDIUM ENCODED WITH WORKFLOW EXECUTING PROGRAM

This application is based on Japanese Patent Application No. 2014-144128 filed with Japan Patent Office on Jul. 14, 2014, the entire content of which is hereby incorporated by reference.

BACKGROUND OF THE INVENTION

Field of the Invention

The present invention relates to a workflow system, a workflow executing device, a workflow executing method, and a non-transitory computer-readable recording medium encoded with a workflow executing program. More specifically, the present invention relates to a workflow system including a workflow executing device that executes a workflow, the workflow executing device, a workflow executing method performed in the workflow executing device, and a non-transitory computer-readable recording medium encoded with a workflow executing program.

Description of the Related Art

Recently, a technique allowing a computer to process a workflow has been known. For example, Japanese Laid-Open Patent Publication No. 2012-243203 describes a data processing apparatus including workflow storage means for storing a workflow indicating the content of a process to be performed on data, reading means for receiving data, identification information of a workflow applied to the data, and destination information of the data and reading out a workflow corresponding to the identification information from the workflow storing means, processing means for executing a process on the received data based on the workflow read by the reading means and distributing the data to a device on a network indicated by the destination information, and usability notifying means for, if an operation verification request is received together with the identification information of the workflow in the workflow storing means, allowing the reading means to read a workflow corresponding to the identification information from the workflow storing means, allowing the processing means to perform operation verification based on the read workflow, and giving a notice to indicate a result of the operation verification.

The data processing apparatus described in Japanese Patent Laid-Open No. 2012-243203, however, merely gives a notice of the result of operation verification and cannot execute a workflow in the end when the processing means fails in operation. In particular, when a workflow defines a process to be executed by, for example, a cloud server, the workflow cannot be executed unless account information for logging into the cloud server is stored in a data processing apparatus that executes the workflow. If account information is stored in a data processing apparatus shared by a plurality of people, the people sharing the data processing apparatus know the account information, leading to a security problem.

SUMMARY OF THE INVENTION

According to an aspect of the present invention, a workflow system includes a workflow executing device, a first external device, and a second external device. The workflow executing device includes a communication unit to communicate with an external device, and a controller. The controller of the workflow executing device executes: a workflow specifying step of specifying a workflow that defines a plurality of processes; a workflow executing step of executing the plurality of processes defined by the specified workflow; an external process specifying step of specifying an external process to be processed by the first external device from among the plurality of processes; a device specifying step of, if the external process is specified, specifying a device that stores account information requested by the first external device as a second external device in order to allow the first external device to execute the external process; a sub-workflow generating step of generating a sub-workflow that defines a login process of logging into the first external device using the account information, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow. The workflow executing step includes a step of, if the external process is specified in the external process specifying step, executing the workflow changed in the workflow changing step in place of the specified workflow. The first external device includes an account information storage unit to store account information, and a controller. The controller of the first external device executes: an account information requesting step of requesting account information; and a service providing step of, on condition that account information received in response to the request in the account information requesting step is stored in the account information storage unit, providing a service of executing the external process and returning an execution result to a device that has transmitted the received account information. The second external device includes a device-side storage unit that stores account information registered in the first external device, and a controller. The controller of the second external device executes a sub-workflow executing step of executing a process defined by the sub-workflow in response to reception of the sub-workflow from the workflow executing device.

According to another aspect of the present invention, a workflow executing device capable of executing a workflow includes a communication unit to communicate with an external device, and a controller. The controller executes: a workflow specifying step of specifying a workflow that defines a plurality of processes; a workflow executing step of executing the plurality of processes defined by the specified workflow; an external process specifying step of specifying an external process to be processed by a first external device from among the plurality of processes; a device specifying step of, if the external process is specified, specifying a device that stores account information requested by the first external device as a second external device in order to allow the first external device to execute the external process; a sub-workflow generating step of generating a sub-workflow that defines a login process of logging into the first external device using the account information, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow. The workflow executing step includes a step of, if the external process is specified in the external process specifying step, executing the workflow changed in the workflow changing step in place of the specified workflow.

According to a further aspect of the present invention, a workflow executing method is performed in a workflow executing device including a communication unit to communicate with an external device. The method includes: a workflow specifying step of specifying a workflow that defines a plurality of processes; a workflow executing step of executing the plurality of processes defined by the specified workflow; an external process specifying step of specifying an external process to be processed by a first external device from among the plurality of processes; a device specifying step of, if the external process is specified, specifying a device that stores account information requested by the first external device as a second external device in order to allow the first external device to execute the external process; a sub-workflow generating step of generating a sub-workflow that defines a login process of logging into the first external device using the account information, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow. The workflow executing step includes a step of, if the external process is specified in the external process specifying step, executing the workflow changed in the workflow changing step in place of the specified workflow.

According to yet another aspect of the present invention, a non-transitory computer-readable recording medium is encoded with a workflow executing program executed in a computer that controls a workflow executing device including a communication unit to communicate with an external device. The program causes the computer to execute: a workflow specifying step of specifying a workflow that defines a plurality of processes; a workflow executing step of executing the plurality of processes defined by the specified workflow; an external process specifying step of specifying an external process to be processed by a first external device from among the plurality of processes; a device specifying step of, if the external process is specified, specifying a device that stores account information requested by the first external device as a second external device in order to allow the first external device to execute the external process; a sub-workflow generating step of generating a sub-workflow that defines a login process of logging into the first external device using the account information, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow. The workflow executing step includes a step of, if the external process is specified in the external process specifying step, executing the workflow changed in the workflow changing step in place of the specified workflow.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 7 is a diagram showing an example of data flow in the case where the portable information device stores account information.

DESCRIPTION OF THE PREFERRED EMBODIMENTS

Figure 1:
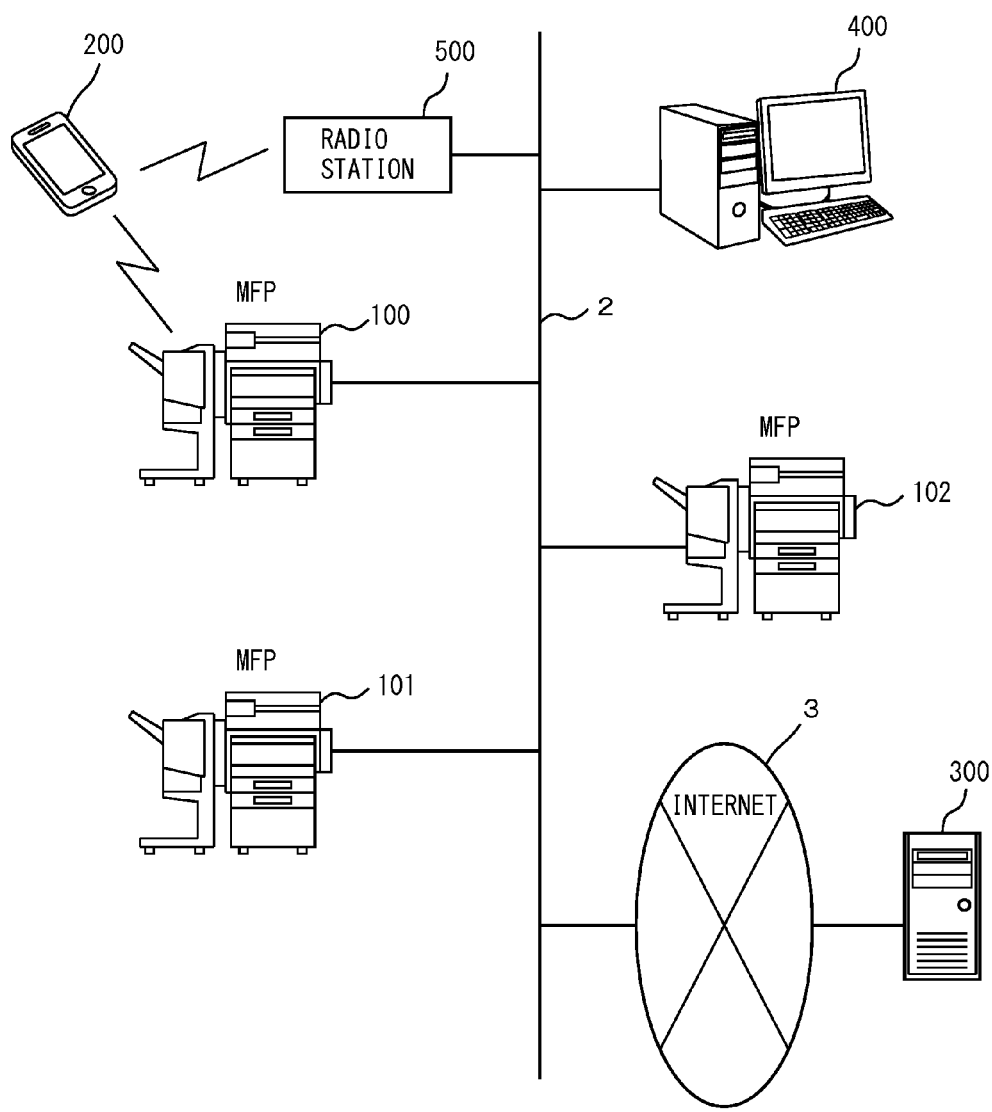
FIG. 1 is a diagram showing an exemplary overview of a workflow management system in an embodiment of the present invention.

Embodiments of the present invention will be described below in conjunction with the figures. In the following description, the same parts are denoted with the same reference numerals. Their names and functions are also the same. A detailed description thereof is therefore not repeated.

FIG. 1 is a diagram showing an exemplary overview of a workflow management system in an embodiment of the present invention. Referring to FIG. 1, workflow management system 1 includes MFPs (Multi Function Peripherals) 100, 101, 102, a portable information device 200, a server 300, a personal computer (PC) 400, and a radio station 500. MFPs 100, 101, 102, PC 400, and radio station 500 are connected to network 2. Network 2 is connected to the Internet 3. Server 300 is connected to the Internet 3.

MFPs 100, 101, 102 are exemplary workflow executing devices. MFPs 100, 101, 102 each have an image scanning function for scanning a document, an image forming function for forming an image on a recording medium such as paper based on image data, and a facsimile transmitting/receiving function of transmitting/receiving facsimile data. Although MFPs 100, 101, 102 will be described as exemplary workflow executing devices in the present embodiment, MFPs 100, 101, 102 may be replaced by any devices that have a function of executing a workflow, for example, such as printers, scanners, and PCs. The hardware and functions of MFPs 100, 101, 102 are the same, and in the following description, MFP 100 will be taken as an example, unless otherwise specified.

Portable information device 200 is, for example, a smartphone or a PDA (Personal Digital Assistant) carried by a user and has a wireless LAN function and a short-range wireless communication function. Here, portable information device 200 is a smartphone and further has a call function. Portable information device 200 thus can communicate with a mobile phone base station by radio to connect to a mobile phone network to make a call.

Server 300 and PC 400 are general computers. The hardware configuration and functions of server 300 and PC 400 are well known, and a description thereof is not repeated here.

Server 300 functions as a cloud server. Here, server 300 is a computer that provides a service of executing a predetermined process. The service provided by server 300 is a character recognition process in the example described here. The character recognition process is a process of recognizing characters in image data and converting the image data into character data. Server 300 provides the service of executing a character recognition process on the precondition that the user is registered in server 300 in advance. For example, server 300 issues account information for each service and specifies the user who requests provision of the service of executing a character recognition process based on the account information. The account information is here, for example, information for identifying a user allowed to use the service. The account information may include information for authenticating the user allowed to use the service, in addition to the information for identifying the user allowed to use the service.

The user having the account information issued by server 300 generally store the account information in a device privately used by the user. Here, the user has a set of the service identification information of the service of executing a character recognition process provided by server 300 and the account information corresponding to the service stored in portable information device 200, by way of example. In this case, MFP 100 does not store the account information issued by server 300 and therefore MFP 100 is not authenticated by server 300. The reason why the account information corresponding to the service is stored only in portable information device 200 for private use is to prevent other people from using the account information. Not storing the account information in MFP 100 shared by people prevents other people from using the account information and thereby increases the security.

Network 2 is a Local Area Network (LAN), either wired or wireless. Network 2 is not limited to a LAN and may be a network using the Public Switched Telephone Network. Network 2 is connected to a Wide Area Network (WAN) such as the Internet 3. MFPs 100, 101, 102 each can transmit/receive data to/from PC 400 through network 2. MFPs 100, 101, 102 each can transmit/receive data to/from server 300 through network 2 and the Internet 3. Radio station 500 is a relay device for network 2 and communicates with portable information device 200 having a wireless LAN communication function to connect portable information device 200 to network 2. Portable information device 200 therefore can transmit/receive data to/from each of MFPs 100, 101, 102 and PC 400 through radio station 500 and network 2. Portable information device 200 can transmit/receive data to/from server 300 through radio station 500, network 2, and the Internet 3.

In the present embodiment, MFP 100 is capable of executing a workflow. A workflow is information that defines a plurality of processes. A workflow may define the order of a plurality of processes. A plurality of processes include a process executable by MFP 100 as well as an external process executed by another computer. An external process is a process executed by a service provided by an external computer. Here, an example of the external process is the service of executing a character recognition process provided by server 300.

In order to use the service provided by server 300 in MFP 100, external process information is stored in advance in HDD 116. The external process information includes information that defines the kind of service provided by server 300 and service identification information for identifying the service. The information that defines the kind of service is process identification information for identifying a character recognition process. The service identification information is, for example, a URL (Uniform Resource Locator) indicating a Web page stored in server 300. The service identification information may be a combination of the network address of server 300 providing the service and process identification information that defines the kind of service, in place of a URL.

In the present embodiment, an example of the workflow stored in MFP 100 defines a document scanning process of scanning a document as a first process, a character recognition process of recognizing characters in the scanned document as a second process, and an email transmitting process of transmitting character data by email as a third process. In this case, the document scanning process and the email transmitting process are internal processes executable by MFP 100, whereas the character recognition process is an external process executable by server 300. MFP 100 may be capable or not capable of executing a character recognition process.

Figure 2:
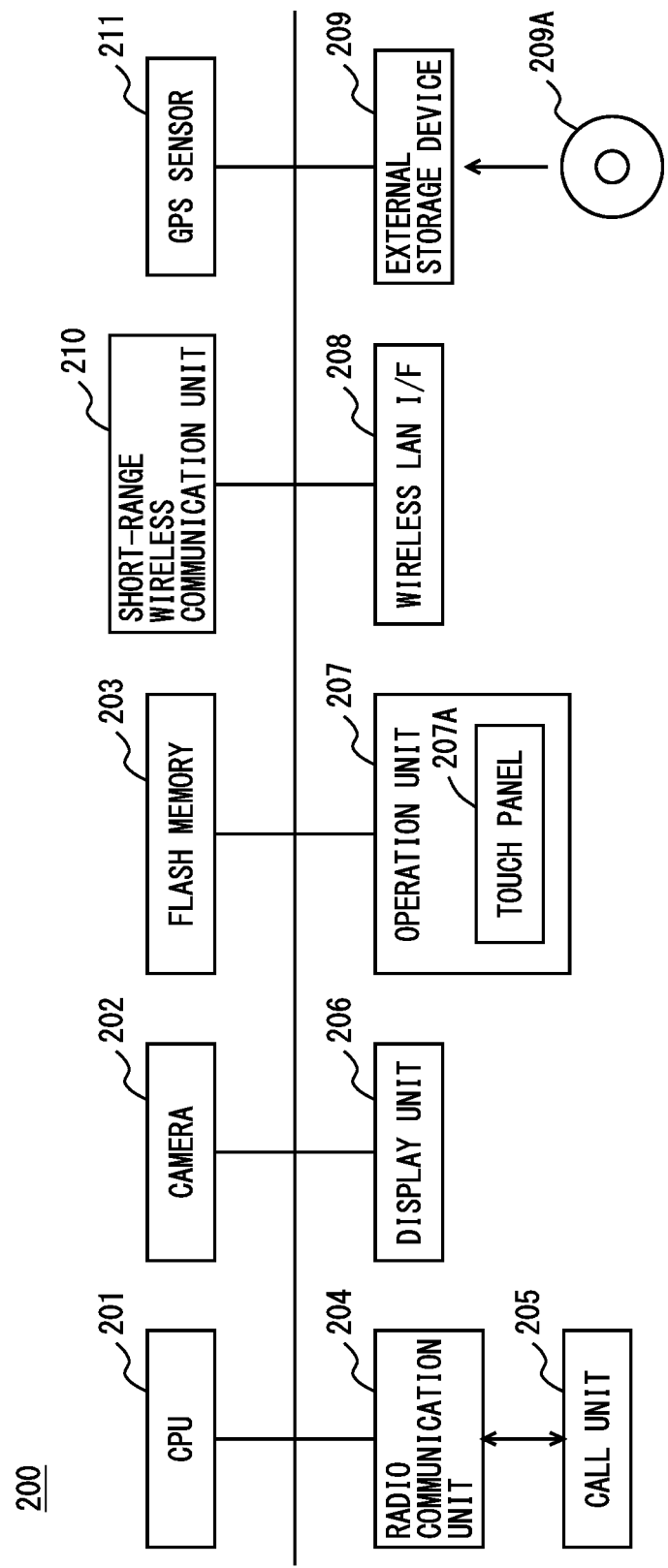
FIG. 2 is a block diagram showing the overall hardware configuration of a portable information device in the present embodiment.

FIG. 2 is a block diagram showing the overall hardware configuration of the portable information device in the present embodiment. Referring to FIG. 2, portable information device 200 includes a CPU 201 for centrally controlling portable information device 200, a camera 202, a flash memory 203 storing data in a nonvolatile manner, a call unit 205, a radio communication unit 204 connected to call unit 205, a display unit 206 displaying information, an operation unit 207 accepting input of a user's operation, a wireless LAN interface (I/F) 208, an external storage device 209, a short-range wireless communication unit 210, and a GPS sensor 211.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 to transmit/receive data through a mobile phone base station and connect portable information device 200, for example, to the Internet. Portable information device 200 thus can communicate with a computer connected to the Internet through radio communication unit 204.

Display unit 206 is a display device such as a liquid crystal display (LCD) or an organic ELD and displays, for example, instruction menus to the user and externally received data.

Camera 202 includes a lens and an optoelectronic transducer such as a CMOS (Complementary Metal Oxide Semiconductor) sensor. Light collected by the lens is imaged on the CMOS sensor. The CMOS sensor transduces the received light and outputs image data to CPU 201. The CMOS sensor may be replaced by a CCD (Charge Coupled Device) sensor.

Camera 202 is arranged on the surface opposite to the surface having display unit 206 such that its optical axis is parallel to the normal to the display surface of display unit 206. When the image captured by camera 202 is displayed on display unit 206, the user can set the imaging range of camera 202 while viewing the captured image appearing on display unit 206.

Operation unit 207 includes a plurality of keys and accepts input of various instructions and data such as characters and numerals through the user's operation corresponding to the keys. Operation unit 207 includes a touch panel 207A. Touch panel 207A detects the position designated by the user in the display surface of display unit 206. Touch panel 207A is provided on the top surface or the bottom surface of display unit 206 and outputs the coordinates of the position designated by the user to CPU 201. Touch panel 207A is a multi-touch screen panel. When a plurality of positions are simultaneously designated by the user, a plurality of sets of coordinates corresponding to the positions designated by the user are output to CPU 201. Touch panel 207A preferably has a size equal to or larger than the display surface of display unit 206. Touch panel 207A is superimposed on display unit 206 so that when the user points on the display surface of display unit 206, touch panel 207A outputs one or more sets of coordinates corresponding to one or more positions designated by the user in the display surface of display unit 206 to CPU 201. Touch panel 207A is, for example, a resistive film panel, a surface acoustic panel, an infrared panel, an electromagnetic induction panel, a capacitive panel, or any other panels.

Wireless LAN I/F 208 is an interface that communicates with radio station 500 of the wireless LAN for connecting portable information device 200 to LAN 2. When wireless LAN I/F 208 communicates with radio station 500, portable information device 200 can communicate with MFPs 100, 101, 102 and server 300.

External storage device 209 is removably attached to portable information device 200. A CD-ROM 209A storing a remote operation program can be attached to external storage device 209. CPU 201 can access CD-ROM 209A through external storage device 209. CPU 201 can load the remote operation program stored in CD-ROM 209A attached to external storage device 209 into the RAM of CPU 201 for execution.

The program stored in flash memory 203 or CD-ROM 209A has been described as a program executed by CPU 201. However, another computer connected to the Internet may overwrite the program stored in flash memory 203 or additionally write a new program. Portable information device 200 may download a program from another computer connected to the Internet. The program herein referred to includes not only a program directly executable by CPU 201 but also a source program, a compressed program, and an encrypted program.

The program executed by CPU 201 may be stored not only in CD-ROM 209A but also in other medium such as an optical disk (MO/MD/DVD), an IC card, an optical card, and a semiconductor memory such as a mask ROM, an EPROM, and an EEPROM.

Short-range wireless communication unit 210 wirelessly communicates with one of MFPs 100, 101, 102 that falls within a communicable range. The communicable distance of short-range wireless communication unit 210 is limited to a predetermined distance, preferably, within a few meters, although not limited thereto. Short-range wireless communication unit 210 performs wireless communication through any communication medium, for example, based on the communication standards of IrDA (Infrared Data Association) or the communication standards of Bluetooth (registered trademark). For example, when MFP 100 is present as the other party in a range of the communicable distance, short-range wireless communication unit 210 detects MFP 100 and becomes able to communicate with MFP 100.

GPS sensor 211 detects the present position of MFP 100 based on radio waves received from GPS (Global Positioning System) satellites. GPS sensor 211 outputs the positional information indicating the detected present position to CPU 201.

Figure 3:
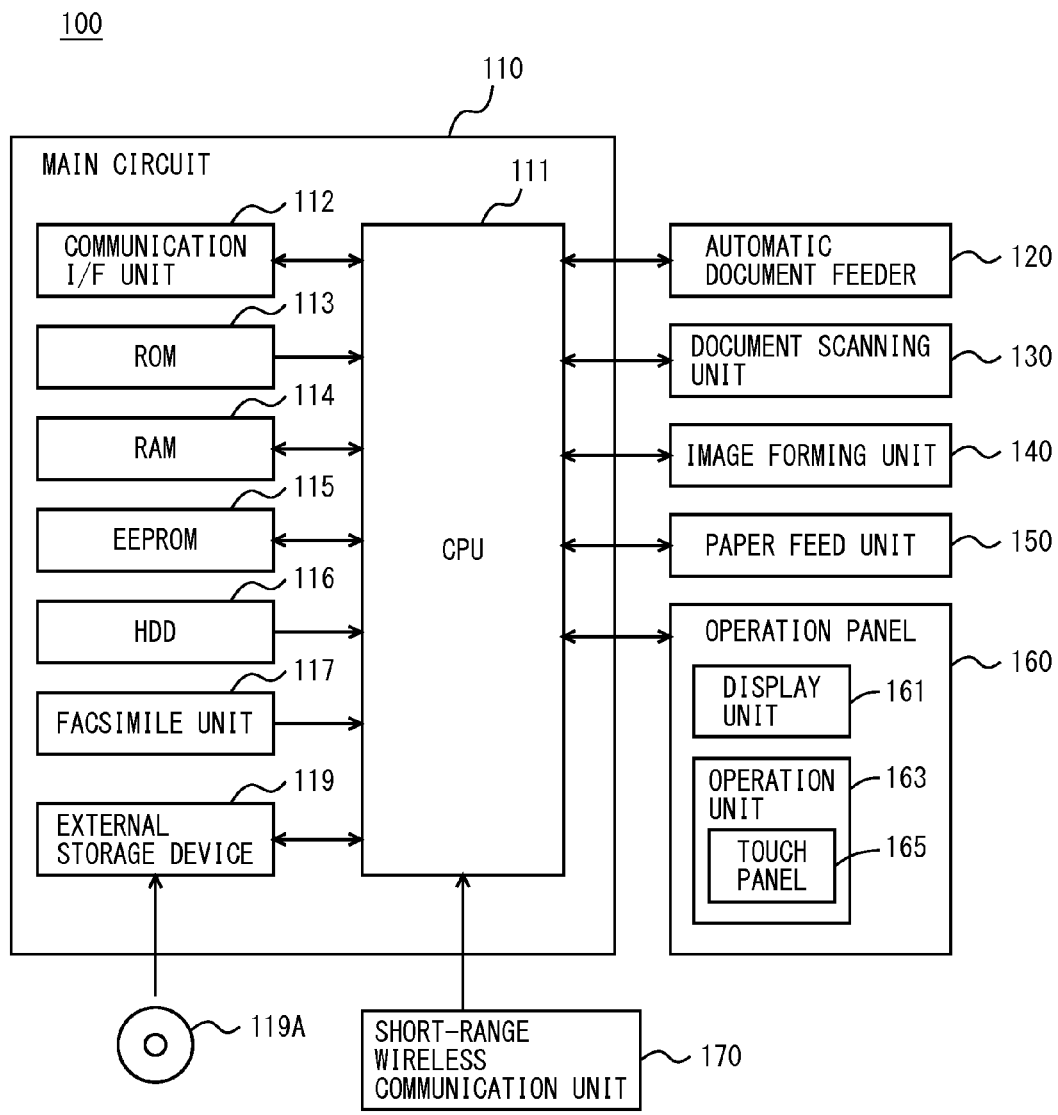
FIG. 3 is a block diagram showing the overall hardware configuration of an MFP in the present embodiment.

FIG. 3 is a block diagram showing the overall hardware configuration of the MFP in the present embodiment. Referring to FIG. 3, MFP 100 includes a main circuit 110, a document scanning unit 130 for scanning a document, an automatic document feeder 120 for conveying a document to document scanning unit 130, an image forming unit 140 for forming an image on paper or other medium based on image data output by document scanning unit 130 scanning a document, a paper feed unit 150 for supplying paper to image forming unit 140, an operation panel 160 serving as a user interface, and a short-range wireless communication unit 170.

Main circuit 110 includes a CPU 111, a communication interface (I/F) unit 112, a ROM 113, a RAM 114, an EEPROM 115, a hard disk drive (HDD) 116 as a mass storage device, a facsimile unit 117, and an external storage device 119 to which a CD-ROM 119A is attached. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary for executing the program. RAM 114 is used as a work area when CPU 111 executes a program. RAM 114 temporarily stores scan data (image data) successively sent from document scanning unit 130.

Operation panel 160 is provided on the top face of MFP 100 and includes a display unit 161 and an operation unit 163. Display unit 161 is a display device such as a liquid crystal display (LCD) or an organic ELD (Electro-Luminescence Display) and displays, for example, instruction menus to users and information about the acquired image data. Operation unit 163 includes a plurality of keys and accepts input of various instructions and data such as characters and numerals through the user's operation corresponding to the keys. Operation unit 163 further includes a touch panel provided on display unit 161.

Communication I/F unit 112 is an interface for connecting MFP 100 to network 2. CPU 111 communicates with MFP 101, 102, PC 400, or portable information device 200 through communication I/F unit 112 to transmit/receive data. Communication I/F unit 112 can also communicate with server 300 connected to the Internet 3 through network 2.

Facsimile unit 117 is connected to the Public Switched Telephone Network (PSTN) to transmit facsimile data to the PSTN or receive facsimile data from the PSTN. Facsimile unit 117 stores the received facsimile data into HDD 116 or outputs it to image forming unit 140. Image forming unit 140 prints the facsimile data received by facsimile unit 117 on paper. Facsimile unit 117 also converts data stored in HDD 116 into facsimile data and transmits the converted facsimile data to a facsimile machine connected to the PSTN.

A CD-ROM 119A is attached to external storage device 119. CPU 111 can access CD-ROM 119A through external storage device 119. CPU 111 loads the program recorded on CD-ROM 119A attached to external storage device 119 into RAM 114 for execution. The program executed by CPU 111 can be stored not only in CD-ROM 119A but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 119A. A program stored in HDD 116 may be loaded into RAM 114 for execution. In this case, another computer connected to network 2 may overwrite the program stored in HDD 116 of MFP 100 or additionally write a new program. MFP 100 may download a program from another computer connected to network 2 and store the program into HDD 116. The program herein referred to includes not only a program directly executable by CPU 111 but also a source program, a compressed program, and an encrypted program.

When portable information device 200 is present within a communicable range, short-range wireless communication unit 170 wirelessly communicates with portable information device 200. The communicable distance of short-range wireless communication unit 170 is limited to a predetermined distance. Short-range wireless communication unit 170 performs wireless communication through any communication medium, for example, based on the communication standards of IrDA (Infrared Data Association) or the communication standards of Bluetooth (registered trademark). For example, when portable information device 200 is present as the other party in a range of the communicable distance, short-range wireless communication unit 170 detects portable information device 200 and becomes able to communicate with portable information device 200.

Figure 4:
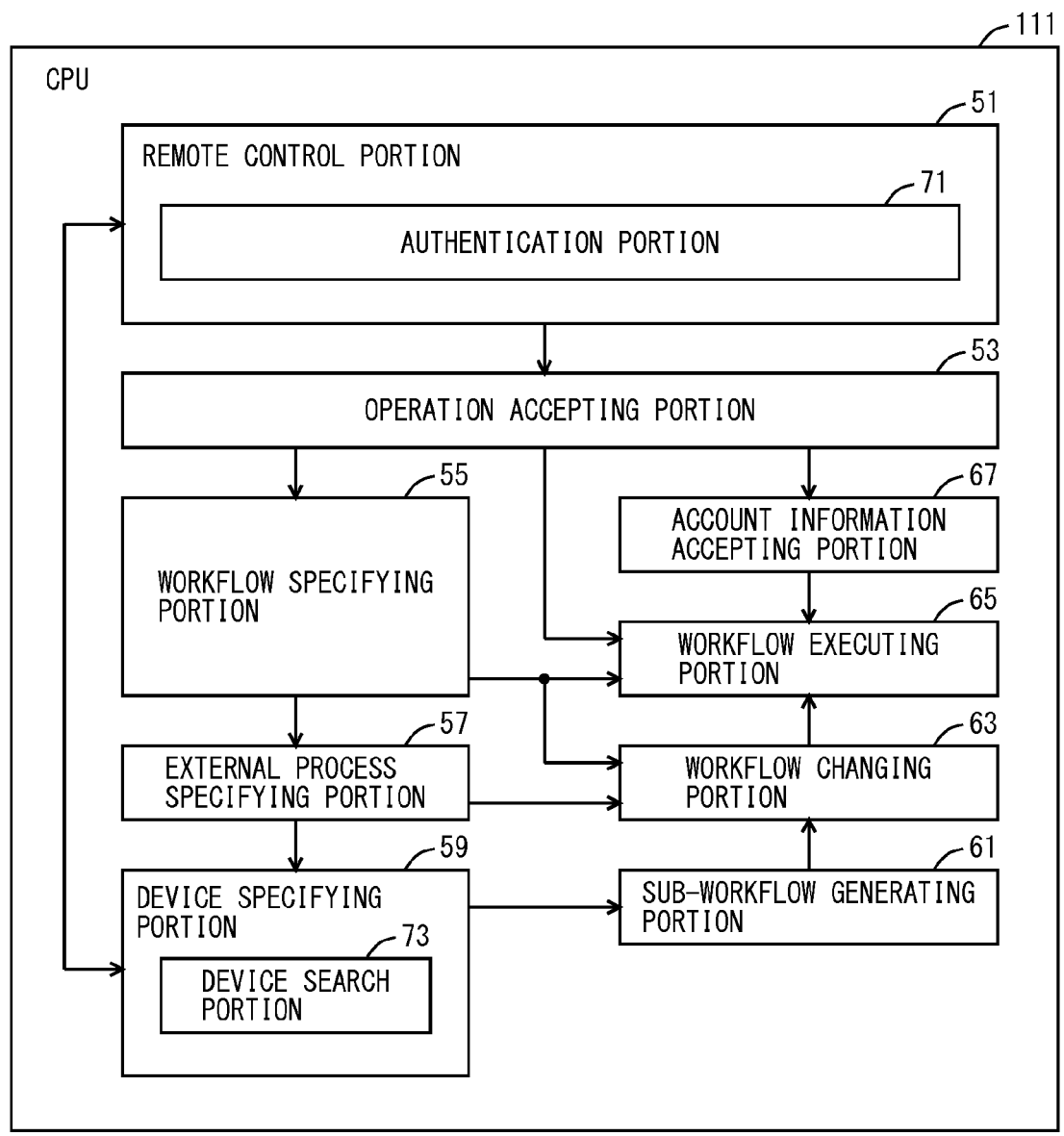
FIG. 4 is a block diagram showing exemplary functions of the CPU of the MFP.

FIG. 4 is a block diagram showing exemplary functions of the CPU of the MFP. The functions of CPU 111 of MFP 100 are formed in CPU 111 by CPU 111 executing a workflow executing program stored in ROM 113, HDD 116, or CD-ROM 119A. Referring to FIG. 4, CPU 111 of MFP 100 includes a remote control portion 51, an operation accepting portion 53, a workflow specifying portion 55, an external process specifying portion 57, a device specifying portion 59, a sub-workflow generating portion 61, a workflow changing portion 63, a workflow executing portion 65, and an account information accepting portion 67.

Remote control portion 51 communicates with an external device connected through communication I/F unit 112 or short-range wireless communication unit 170 to transmit a remote operation screen to the external device and output a remote operation received from the external device to operation accepting portion 53. The remote operation screen transmitted by remote control portion 51 to the external device may be the same screen as the operation screen appearing on display unit 161 or may be a screen different from the operation screen. Here, MFP 100 is remotely controlled by portable information device 200, by way of example. In this case, remote control portion 51 transmits a remote operation screen to portable information device 200 and receives a remote operation from portable information device 200. Although remote control portion 51 transmits a remote operation screen to portable information device 200 and receives a remote operation from portable information device 200, remote control portion 51 does not impose any restrictions on portable information device 200 until receiving a remote operation after transmitting the remote operation screen to portable information device 200. In other words, while a program for remotely controlling MFP 100 is executed in portable information device 200, portable information device 200 can execute a task different from the task that executes the program. Therefore, the user who operates portable information device 200 can execute another application program while remotely controlling MFP 100.

Remote control portion 51 includes an authentication portion 71. Authentication portion 71 authenticates portable information device 200 that communicates with remote control portion 51. Specifically, portable information device 200 is requested to input predetermined authentication information, for example, a user ID and a password. If the authentication information received from portable information device 200 is the authentication information stored in advance in MFP 100, portable information device 200 is authenticated. Otherwise, portable information device 200 is not authenticated. If authentication by authentication portion 71 is successful, remote control portion 51 accepts a remote operation received from portable information device 200. If authentication by authentication portion 71 is failed, a remote operation received from portable information device 200 is not accepted. Authentication information is not limited to a set of a user ID and a password but may be the device identification information for identifying portable information device 200. The device identification information may be a network address, for example, such as an IP address or a MAC address or may be a domain name allocated to the device on network 2.

Operation accepting portion 53 accepts a remote operation input from remote control portion 51 or an operation input to operation unit 163 by the user operating operation unit 163.

Workflow specifying portion 55 specifies a workflow selected by the user from among one or more workflows stored in HDD 116. Workflow specifying portion 55 outputs the workflow identification information for identifying the specified workflow to external process specifying portion 57, workflow changing portion 63, and workflow executing portion 65.

When the user operates operation unit 163, a workflow selecting screen appears on display unit 161 to accept an operation input by the user to operation unit 163 for specifying a workflow. The workflow selecting screen includes a list of one or more workflows stored in HDD 116 to allow the user to select one of the one or more workflows. When the user remotely operates MFP 100 using portable information device 200, remote control portion 51 transmits the workflow selecting screen to portable information device 200 as a remote operation screen, and remote control portion 51 receives a remote operation of specifying the workflow selected by the user with portable information device 200.

Here, the user selects a workflow stored in HDD 116, which defines a document scanning process of scanning a document as a first process, a character recognition process of recognizing characters in the scanned document as a second process, and an email transmitting process of transmitting character data by email as a third process, by way of example.

External process specifying portion 57 reads out the workflow specified by the workflow identification information input from workflow specifying portion 55 from HDD 116 and extracts the external process from among a plurality of processes included in the workflow by referring to the external process information. External process specifying portion 57 outputs external process information including the process identification information for identifying the specified external process to device specifying portion 59 and workflow changing portion 63. Here, a character recognition process is specified as an external process, and the external process information including the process identification information of the character recognition process includes the service identification information of the service of executing a character recognition process provided by server 300.

Device specifying portion 59 specifies a device that has account information corresponding to the service identification information of the external process information input from external process specifying portion 57. When MFP 100 is remotely operated by portable information device 200, device specifying portion 59 sends an inquiry about the presence/absence of account information to portable information device 200. This inquiry includes the service identification information of the external process information input from external process specifying portion 57.

Portable information device 200, receiving the inquiry about the presence/absence of account information from MFP 100, determines whether account information corresponding to the service identification information included in the inquiry is stored. If such account information is stored, portable information device 200 returns a reply indicating the presence of account information in response to the inquiry from MFP 100. If such account information is not stored, portable information device 200 returns a reply indicating the absence of account information in response to the inquiry from MFP 100. Here, portable information device 200 stores the account corresponding to the service of executing a character recognition process provided by server 300, by way of example. In this case, portable information device 200 returns a reply indicating the presence of account information in response to the inquiry from MFP 100.

Even when portable information device 200 stores account information, whether to return a reply indicating the presence of account information or to return a reply indicating the absence of account information may be decided on the portable information device 200 side. For example, portable information device 200 may return a reply indicating the presence of account information on condition that MFP 100 is registered in portable information device 200 in advance. Alternatively, portable information device 200 may receive the user identification information of the user who operates MFP 100 from MFP 100 and may return a reply indicating the presence of account information on condition that the user identification information is registered in advance. In addition, authentication information may be stored in advance in portable information device 200, and portable information device 200 may request authentication information from MFP 100 and return a reply indicating the presence of account information on condition that authentication is successful based on authentication information received from MFP 100. If a reply indicating the presence of account information is received from portable information device 200, device specifying portion 59 specifies portable information device 200 as an account holder device. If a reply indicating the presence of account information is not received from portable information device 200, portable information device 200 is not specified as an account holder device. If an account holder device is specified, device specifying portion 59 outputs the device identification information of portable information device 200 as an account holder device to sub-workflow generating portion 61.

Device specifying portion 59 includes a device search portion 73. Device search portion 73 broadcasts an inquiry about the presence/absence of account information for receiving provision of the service of executing a character recognition process provided by server 300, when MFP 100 is remotely operated by portable information device 200 and portable information device 200 does not store account information, or when MFP 100 is not remotely operated by portable information device 200. Specifically, a packet to inquire about the presence/absence of account information is broadcasted through communication I/F unit 112. For example, if the user has stored a set of the service identification information of the service of server 300 executing a character recognition process and the account information corresponding to the service into PC 400, PC 400 returns a signal indicating that PC 400 has the account information, in response to the inquiry about the presence/absence of account information. In this case, device search portion 73 specifies PC 400 as an account holder device. When the account holder device is specified, device specifying portion 59 outputs the device identification information of PC 400 as an account holder device to sub-workflow generating portion 61. The device identification information of PC 400 is a network address, for example, an IP address, a MAC address, or a domain name.

Even when PC 400 stores account information, whether to return a reply indicating the presence of account information or to return a reply indicating the absence of account information may be decided on the PC 400 side. For example, a reply indicating the presence of account information may be returned on condition that MFP 100 is registered in advance in PC 400. Alternatively, PC 400 may receive the user identification information of the user who operates MFP 100 from MFP 100 and may return a reply indicating the presence of account information on condition that the user identification information is registered in advance. In addition, authentication information may be stored in PC 400 in advance, and PC 400 may request authentication information from MFP 100 and may return a reply indicating the presence of account information on condition that authentication is successful based on the authentication information received from MFP 100.

When short-range wireless communication unit 170 is able to communicate with another device, an inquiry about the presence/absence of account information is sent to a device that short-range wireless communication unit 170 can communicate with. For example, when the user operates operation unit 163 of MFP 100, if the user carries portable information device 200, short-range wireless communication unit 170 becomes able to communicate with portable information device 200. In this case, device specifying portion 59 sends an inquiry about the presence/absence of account information portable information device 200 through short-range wireless communication unit 170. Portable information device 200 returns a signal indicating the presence of account information in response to the inquiry about the presence/absence of account information, so that portable information device 200 is specified as an account holder device. When an account holder device is specified, device specifying portion 59 outputs the device identification information of portable information device 200 as an account holder device to sub-workflow generating portion 61.

When device search portion 73 receives a reply indicating the presence of account information from each of PC 400 and portable information device 200, device search portion 73 specifies one of PC 400 and portable information device 200 as an account holder device.

Sub-workflow generating portion 61 receives the device identification information of the account holder device from device specifying portion 59. Sub-workflow generating portion 61 generates a sub-workflow for allowing the account holder device to execute an external process. The sub-workflow includes a process of logging into server 300 that provides the service of executing an external process using account information, a process of requesting server 300 to execute a character recognition process as an external process, and a process of transmitting data obtained by server 300 executing a character recognition process to MFP 100. Sub-workflow generating portion 61 outputs a set of the generated sub-workflow and the device identification information of the account holder device to workflow changing portion 63.

Workflow changing portion 63 receives the workflow identification information from workflow specifying portion 55. Workflow changing portion 63 may receive or may not receive the process identification information of an external process from external process specifying portion 57. When a workflow includes an external process, process identification information is input from external process specifying portion 57. When a workflow does not include an external process, process identification information is not input from external process specifying portion 57. When an external process is input from external process specifying portion 57, workflow changing portion 63 may receive a set of a sub-workflow and the device identification information of an account holder device from sub-workflow generating portion 61 or may not receive a set of a sub-workflow and the device identification information of an account holder device. When an account holder device is specified by device specifying portion 59, a set of a sub-workflow and the device identification information of the account holder device is input. When an account holder device is not specified by device specifying portion 59, the set is not input.

When a sub-workflow is input from sub-workflow generating portion 61, workflow changing portion 63 replaces, among a plurality of processes included in the workflow input from workflow specifying portion 55, the external process specified by the process identification information input from external process specifying portion 57, here, the second process, by a process of allowing the account holder device that is portable information device 200 to execute the sub-workflow. Workflow changing portion 63 outputs the changed workflow in which the external process in the workflow is replaced by the process of allowing portable information device 200 to execute the sub-workflow, to workflow executing portion 65.

When the changed workflow is input from workflow changing portion 63, workflow executing portion 65 executes the changed workflow in response to acceptance of an instruction to execute the workflow from operation accepting portion 53. The changed workflow includes a process of allowing portable information device 200 to execute the sub-workflow. At the stage when the second process is executed, image data obtained by scanning a document is obtained by executing a document scanning process that is the first process preceding the second process. Workflow executing portion 65 transmits the image data obtained by executing the first process that is a document scanning process as input data and the sub-workflow to portable information device 200. Portable information device 200 receives the image data and the sub-workflow and then executes the sub-workflow on the image data. Specifically, portable information device 200 logs into server 300 using the account information stored in the device itself, allows server 300 to execute a character recognition process on the image data, receives character data obtained by executing a character recognition process on the image data from server 300, and transmits the received character data to MFP 100. Workflow executing portion 65 receives the character data obtained by recognizing characters in the image data from portable information device 200 and then executes the third process. Since the third process is a process of transmitting an email, workflow executing portion 65 transmits an email including the received character data, and the workflow is finished.

When the changed workflow is not input from workflow changing portion 63, workflow executing portion 65 executes the workflow specified by the workflow identification information input from workflow specifying portion 55. In doing so, when, among a plurality of processes defined by the workflow, an external process is to be executed, workflow executing portion 65 refers to the external process information stored in HDD 116 to acquire the service identification information of the service of executing a character recognition process provided by server 300, and then accesses server 300. If the service specified by the service identification information is accessed, server 300 transmits an account input screen. Workflow executing portion 65 then outputs the account input screen received from server 300 to account information accepting portion 67.

When remotely controlled by portable information device 200, workflow executing portion 65 executes the workflow or the changed workflow in response to remote control portion 51 receiving an instruction to execute the workflow from portable information device 200. After an instruction to execute the workflow is received from portable information device 200, remote control portion 51 is on standby to be ready for receiving another remote operation from portable information device 200 even while workflow executing portion 65 is executing the workflow or the changed workflow. In other words, although a program for remotely controlling MFP 100 is executed in portable information device 200, the task that executes the program can accept another remote operation and transmit the operation to MFP 100 even after an instruction to execute the workflow is transmitted to MFP 100 from the user. For example, the operation of selecting another workflow and executing the workflow may be input, or the operation of allowing MFP 100 to make prints may be input. Portable information device 200 thus can be used effectively.

In response to input of the account input screen from workflow executing portion 65, account information accepting portion 67 accepts account information input by the user in accordance with the account input screen from operation accepting portion 53. Specifically, when MFP 100 is remotely operated by portable information device 200, account information accepting portion 67 receives a remote operation including account information input by the user to portable information device 200 in accordance with the account input screen transmitted by remote control portion 51 to portable information device 200. Account information accepting portion 67 accepts the account information included in the remote operation through operation accepting portion 53.

When the user operates operation panel 160, account information accepting portion 67 displays an account input screen on display unit 161 and accepts the account information input by the user to operation unit 163 through operation accepting portion 53. Account information accepting portion 67 outputs the account information input by the user to workflow executing portion 65.

Workflow executing portion 65 transmits the account information input from account information accepting portion 67 to server 300 and allow it to be authenticated by server 300. Workflow executing portion 65 then transmits the image data obtained by executing a document scanning process as a pre-process to server 300 to allow server 300 to execute a character recognition process on the image data and receives character data obtained through execution of a character recognition process on the image data from server 300. Workflow executing portion 65 executes a process of transmitting the character data received from server 300 by email, and the workflow is finished.

Figure 5:
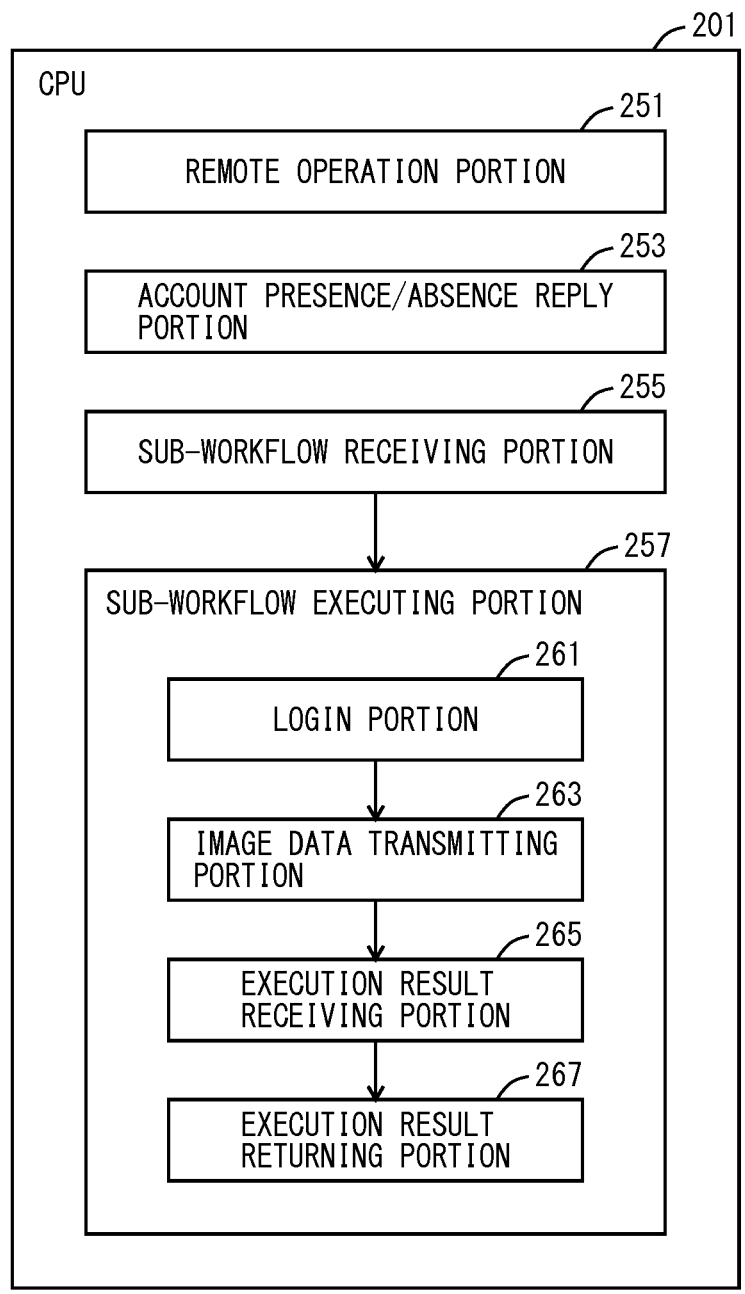
FIG. 5 is a block diagram showing exemplary functions of the CPU of the portable information device.

FIG. 5 is a block diagram showing exemplary functions of the CPU of the portable information device. The functions shown in FIG. 5 are formed in CPU 201 by CPU 201 of portable information device 200 executing a proxy execution program and a remote operation program stored in flash memory 203 or CD-ROM 209A. Referring to FIG. 5, CPU 201 of portable information device 200 includes a remote operation portion 251 to remotely control one of MFPs 100, 101, 102, an account presence/absence reply portion 253, a sub-workflow receiving portion 255, and a sub-workflow executing portion 257.

Remote operation portion 251 is a function formed in CPU 201 by CPU 201 executing the remote operation program stored in flash memory 203 or CD-ROM 209A. Remote operation portion 251 specifies a device to be remotely operated, for example, by displaying a selecting screen for selecting one of MFPs 100, 101, 102 on display unit 206 so that the user selects one of MFPs 100, 101, 102. Here, the user selects MFP 100, by way of example. When MFP 100 is specified as a device to be remotely operated, remote operation portion 251 accesses MFP 100 through wireless LAN I/F 208 and receives a remote operation screen from MFP 100. Remote operation portion 251 displays the received remote operation screen on display unit 206 and accepts an operation input by the user to operation unit 207. Remote operation portion 251 transmits the operation accepted by operation unit 207 as a remote operation to MFP 100 through wireless LAN I/F 208. As described above, MFP 100 receiving the remote operation executes a process in accordance with the remote operation.

When a remote operation screen for requesting input of a user ID and a password is received from MFP 100, remote operation portion 251 transmits the user ID and the password input by the user to operation unit 207 to MFP 100 through wireless LAN I/F 208. As described above, MFP 100 receiving the user ID and the password returns an authentication result. If wireless LAN I/F 208 receives an authentication result indicating authentication success from MFP 100, remote operation portion 251 determines that MFP 100 can be remotely operated.

Account presence/absence reply portion 253, sub-workflow receiving portion 255, and sub-workflow executing portion 257 are formed in CPU 201 by CPU 201 of portable information device 200 executing the proxy execution program. Therefore, a set of account presence/absence reply portion 253, sub-workflow receiving portion 255 and sub-workflow executing portion 257, and remote operation portion 251 are two tasks in which CPU 201 executes different application programs. CPU 201 thus executes two tasks concurrently. In other words, the task in which CPU 201 executes the proxy execution program and the task in which CPU 201 executes the remote operation program can independently execute processes. The task of executing the proxy execution program can execute a process while the user is remotely operating MFP 100. The user therefore can remotely operate MFP 100 while the task of executing the proxy execution program is executing a process.

When wireless LAN I/F 208 receives an inquiry about the presence/absence of account information from MFP 100, account presence/absence reply portion 253 determines whether the account information corresponding to the service identification information included in the inquiry is stored. Here, assume that portable information device 200 stores the account information corresponding to the service identification information. For example, when the user of portable information device 200 registers the service of executing a character recognition process provided by server 300, server 300 issues account information indicating the authority to use the service. The user inputs a set of the service identification information of the service provided by server 300 and the account information issued by server 300 to portable information device 200 and stores the set in flash memory 203.

When wireless LAN I/F 208 or short-range wireless communication unit 210 receives an inquiry about the presence/absence of account information from MFP 100, account presence/absence reply portion 253 returns "account information present" if the account information corresponding to the service identification information included in the inquiry is stored in flash memory 203. If not stored, "account information absent" is returned.

Even when the account information is stored in flash memory 203, account presence/absence reply portion 253 may return "account information present" on condition that the device that has transmitted the inquiry about the presence/absence of account information, here, MFP 100, is registered in advance. In this case, portable information device 200 executes a sub-workflow on condition that the sub-workflow is received from a predetermined device.

Sub-workflow receiving portion 255 controls wireless LAN I/F 208 to receive a sub-workflow and image data from MFP 100. Sub-workflow receiving portion 255 may control short-range wireless communication unit 210 to receive a sub-workflow and image data from MFP 100. Sub-workflow receiving portion 255 outputs the received sub-workflow and image data to sub-workflow executing portion 257.

In response to input of the sub-workflow and image data, sub-workflow executing portion 257 executes a process on the image data in accordance with the sub-workflow. The sub-workflow includes a process of logging into server 300 using account information, a process of requesting server 300 to execute a character recognition process that is an external process, and a process of transmitting data obtained by server 300 executing a character recognition process to MFP 100.

Sub-workflow executing portion 257 includes a login portion 261, an image data transmitting portion 263, an execution result receiving portion 265, and an execution result returning portion 267. Login portion 261 reads out the account information paired with the service identification information provided by server 300 among account information stored in flash memory 203, in accordance with the process of logging into server 300 using account information among a plurality of processes defined by the sub-workflow, and transmits the account information to server 300 through wireless LAN I/F 208. The account information stored in flash memory 203, which is the account information issued by server 300, is authenticated by server 300 to permit the login. If server 300 permits the login, login portion 261 transmits a transmission instruction to image data transmitting portion 263.

Image data transmitting portion 263 receives the transmission instruction from login portion 261, then transmits image data paired with the sub-workflow to server 300 through wireless LAN I/F 208, in accordance with the process of requesting server 300 to execute a character recognition process that is an external process, among a plurality of processes defined by the sub-workflow, and outputs a reception instruction to execution result receiving portion 265. Server 300 receiving the image data executes a character recognition process on the received image data and returns the execution result.

In response to input of the reception instruction from image data transmitting portion 263, execution result receiving portion 265 controls wireless LAN I/F 208 to receive the execution result from server 300. Execution result receiving portion 265 outputs the execution result to execution result returning portion 267.

Execution result returning portion 267 receiving the execution result controls wireless LAN I/F 208 to transmit the execution result to MFP 100, in accordance with the process of transmitting data obtained by server 300 executing a character recognition process to MFP 100, among a plurality of processes defined by the sub-workflow.

Figure 6:
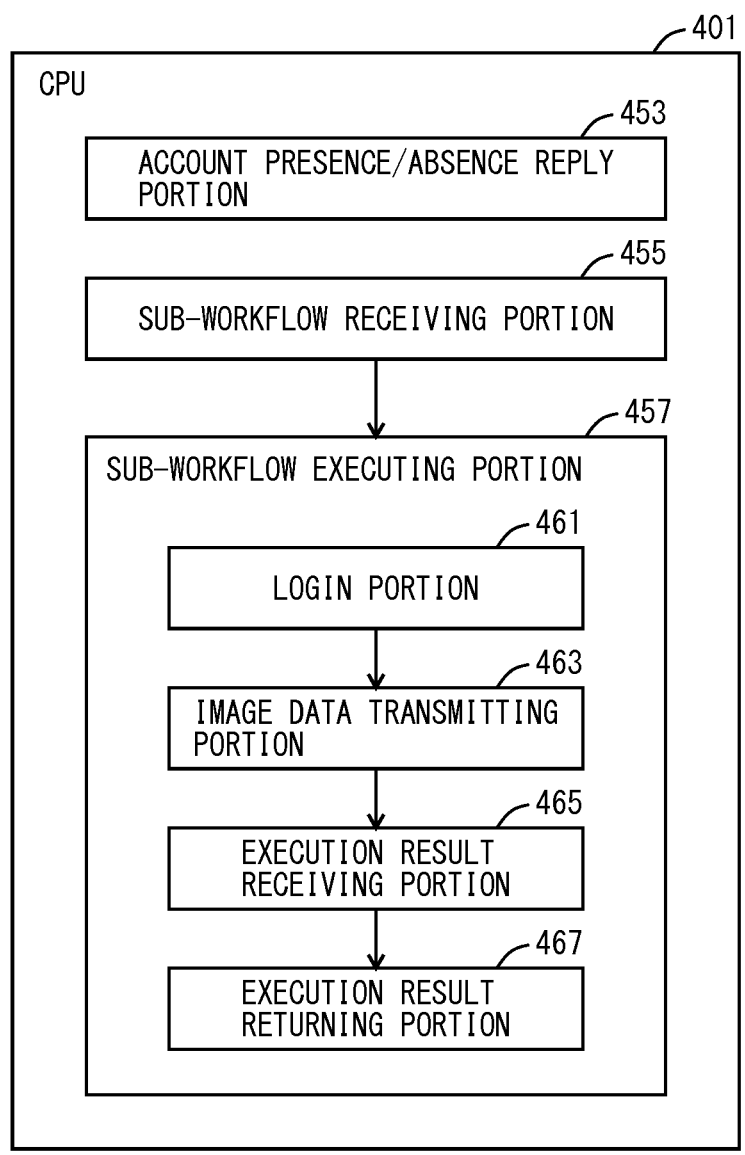
FIG. 6 is a block diagram showing exemplary functions of the CPU of a PC.

FIG. 6 is a block diagram showing exemplary functions of the CPU of the PC. The functions shown in FIG. 6 are formed in CPU 401 by CPU 401 of PC 400 executing a proxy execution program stored in a storage device such as an HDD. CPU 401 can execute another application program in addition to the task of executing the proxy execution program. In other words, the task in which CPU 401 executes the proxy execution program and the task in which CPU 401 executes another application program can execute processes independently. Therefore, the user can input an instruction to the task in which CPU 401 executes another application program while the task of executing the proxy execution program is executing a process.

Referring to FIG. 6, CPU 401 of PC 400 includes an account presence/absence reply portion 453, a sub-workflow receiving portion 455, and a sub-workflow executing portion 457. Account presence/absence reply portion 453 receives an inquiry about the presence/absence of account information from MFP 100 and then determines whether the account information corresponding to the service identification information included in the inquiry is stored. Here, assume that PC 400 stores the account information corresponding to the service identification information. For example, when the user of PC 400 registers the service of executing a character recognition process provided by server 300, server 300 issues account information indicating the authority to use the service. The user inputs a set of the service identification information of the service provided by server 300 and the account information issued by server 300 to PC 400 and stores the set in a storage device such as the HDD of PC 400.

When receiving an inquiry about the presence/absence of account information from MFP 100, account presence/absence reply portion 453 returns "account information present" if the account information corresponding to the service identification information included in the inquiry is stored. If not stored, "account information absent" is returned.

Even when the account information is stored in PC 400, account presence/absence reply portion 453 may return "account information present" on condition that the device that has transmitted the inquiry about the presence/absence of account information, here, MFP 100, is registered in advance. In this case, PC 400 executes a sub-workflow on condition that the sub-workflow is received from a predetermined device.

Sub-workflow receiving portion 455 receives a sub-workflow and image data from MFP 100. Sub-workflow receiving portion 455 outputs the received sub-workflow and image data to sub-workflow executing portion 457.

In response to input of the sub-workflow and the image data, sub-workflow executing portion 457 executes a process on the image data in accordance with the sub-workflow. The sub-workflow includes a process of logging into server 300 using account information, a process of requesting server 300 to execute a character recognition process that is an external process, and a process of transmitting data obtained by server 300 executing a character recognition process to MFP 100.

Sub-workflow executing portion 457 includes a login portion 461, an image data transmitting portion 463, an execution result receiving portion 465, and an execution result returning portion 467. Login portion 461 reads out the account information paired with the service identification information provided by server 300 among account information stored in PC 400, in accordance with the process of logging into server 300 using account information among a plurality of processes defined by the sub-workflow, and transmits the account information to server 300. The account information stored in PC 400, which is the account information issued by server 300, is authenticated by server 300 to permit the login. If server 300 permits the login, login portion 461 outputs a transmission instruction to image data transmitting portion 463.

Image data transmitting portion 463 receiving the transmission instruction from login portion 461 transmits the image data paired with the sub-workflow to server 300 in accordance with the process of requesting server 300 to execute a character recognition process that is an external process, among a plurality of processes defined by the sub-workflow, and outputs a reception instruction to execution result receiving portion 465. Server 300 receiving the image data executes a character recognition process on the received image data and returns the execution result.

In response to input of the reception instruction from image data transmitting portion 463, execution result receiving portion 465 receives the execution result from server 300. Execution result receiving portion 465 outputs the execution result to execution result returning portion 467.

Execution result returning portion 467 receiving the execution result transmits the execution result to MFP 100, in accordance with the process of transmitting data obtained by server 300 executing a character recognition process to MFP 100, among a plurality of processes defined by the sub-workflow.

FIG. 7 is a diagram showing an example of data flow in the case where the portable information device stores account information. Referring to FIG. 7, the time flows from top to bottom. In the example shown, MFP 100 is remotely controlled using portable information device 200. Referring to FIG. 7, a user ID and a password are transmitted from portable information device 200 to MFP 100. The user gives an instruction to portable information device 200 to specify MFP 100 as a device to be remotely operated and then receives a remote operation screen from MFP 100 to request input of a user ID and a password. The user of portable information device 200 inputs a user ID and a password in accordance with the remote operation screen. The user ID and the password are then transmitted from portable information device 200 to MFP 100.

MFP 100 authenticates the user ID and the password received from portable information device 200. If authentication is successful, a remote operation screen is transmitted to portable information device 200.

Portable information device 200 receiving the remote operation screen displays the received remote operation screen on display unit 206 and transmits the operation input by the user to operation unit 207 as a remote operation to MFP 100. MFP 100 receiving the remote operation from portable information device 200 executes a process defined by the remote operation. For example, when a remote operation to execute a workflow stored in HDD 116 is received, the workflow is executed. If the workflow includes an external process to be executed by a service provided by server 300, MFP 100 specifies a device that stores the account information issued by server 300 for the service provided by server 300. In this case, MFP 100 sends an inquiry about account information to portable information device 200 that is remotely controlling MFP 100. When the inquiry about account information is received from MFP 100, portable information device 200 returns "account present" to MFP 100 if the corresponding account information is stored in flash memory 203.

If "account present" is returned from portable information device 200, MFP 100 decides on portable information device 200 as an access device and generates a sub-workflow to be executed by the access device. MFP 100 then changes the external process in the workflow to a process of transmitting the sub-workflow to the access device and a process of receiving the execution result, and executes the changed workflow. MFP 100 has acquired image data by executing the workflow up to the process immediately before the process of transmitting the sub-workflow to the access device. MFP 100 transmits the image data and the sub-workflow to the access device that is portable information device 200.

Portable information device 200 receiving the sub-workflow and the image data executes a process defined by the sub-workflow on the image data. The sub-workflow defines a process of logging into server 300 using account information, a process of requesting server 300 to execute a character recognition process that is an external process, and a process of transmitting data obtained by server 300 executing a character recognition process to MFP 100.

Portable information device 200 transmits the account information to server 300. Server 300 performs authentication based on the account information. If authentication is successful, server 300 permits the login by portable information device 200 and returns a permission signal to portable information device 200. Portable information device 200 receives the permission signal for login from server 300 and then transmits the image data input together with the sub-workflow from MFP 100 to server 300. Server 300 receiving the image data executes a character recognition process on the image data and returns the execution result of the character recognition process.

Portable information device 200 transmits the execution result received from server 300 to MFP 100. MFP 100 receives the execution result from portable information device 200 and then executes the remaining process defined by the workflow on the character information of the execution result. In the present embodiment, an email including the character information is generated and transmitted.

Figure 8:
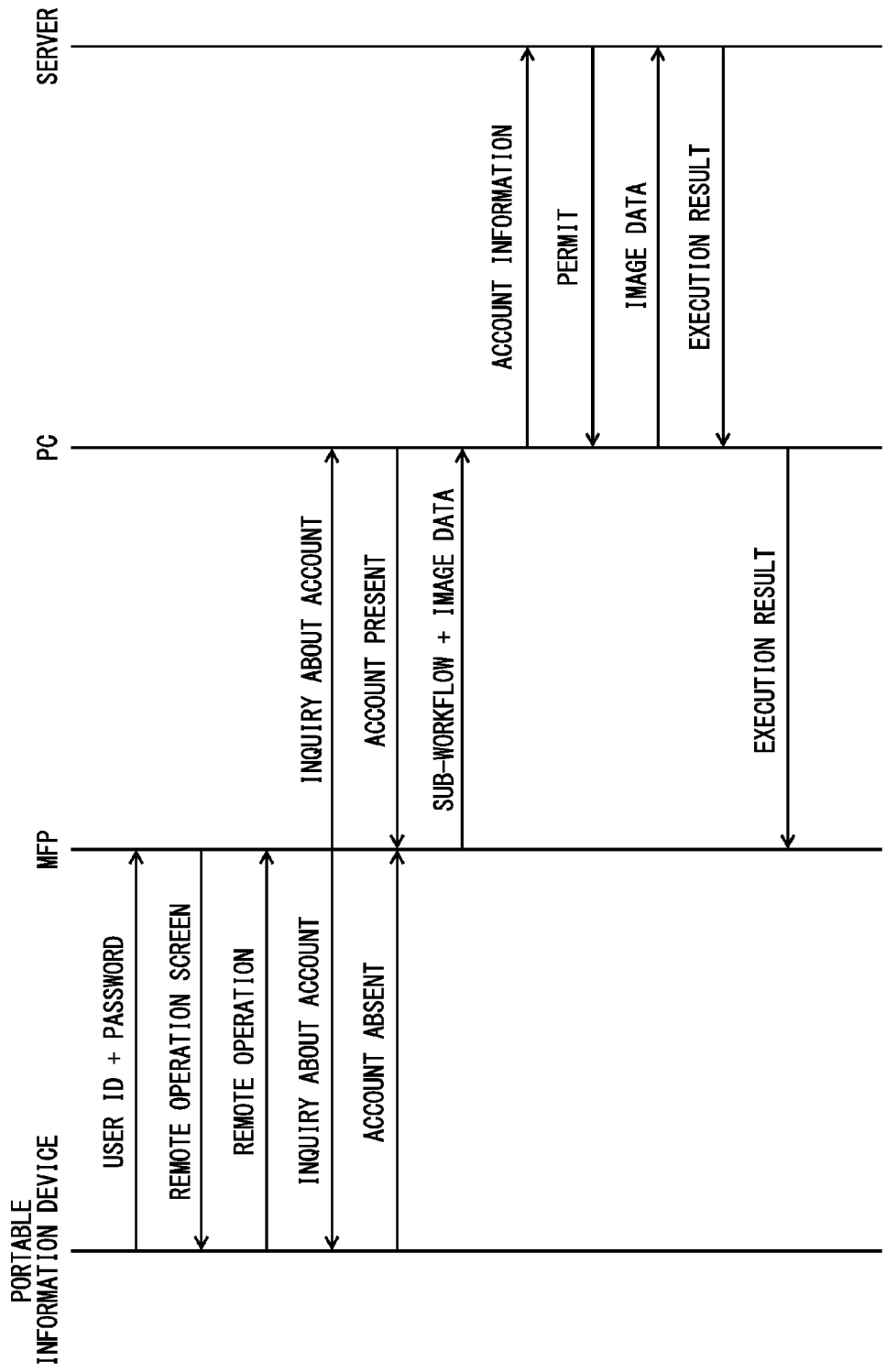
FIG. 8 is a diagram showing an example of data flow in the case where the PC stores account information.

FIG. 8 is a diagram showing an example of data flow in the case where the PC stores account information. Referring to FIG. 8, the time flows from top to bottom. In the example shown, MFP 100 is remotely controlled using portable information device 200. Referring to FIG. 8, a user ID and a password are transmitted from portable information device 200 to MFP 100. The user gives an instruction to portable information device 200 to specify MFP 100 as a device to be remotely operated and then receives a remote operation screen requesting input of a user ID and a password from MFP 100. The user of portable information device 200 inputs a user ID and a password in accordance with the remote operation screen. The user ID and the password are then transmitted from portable information device 200 to MFP 100.

MFP 100 authenticates the user ID and the password received from portable information device 200. If authentication is successful, a remote operation screen is transmitted to portable information device 200.

Portable information device 200 receiving the remote operation screen displays the received remote operation screen on display unit 206 and transmits the operation input by the user to operation unit 207 as a remote operation to MFP 100. MFP 100 receives the remote operation from portable information device 200 and then executes a process defined by the remote operation. For example, when a remote operation to execute a workflow stored in HDD 116 is received, the workflow is executed. If the workflow includes an external process to be executed by a service provided by server 300, MFP 100 specifies a device that stores the account information issued by server 300 for the service provided by server 300. Here, assume that portable information device 200 that is remotely controlling MFP 100 does not store account information but PC 400 stores account information. MFP 100 broadcasts an inquiry for account information. Portable information device 200 receiving the inquiry for account information from MFP 100 returns "account absent" to MFP 100 because the corresponding account information is not stored in flash memory 203. On the other hand, PC 400 receiving the inquiry for account information returns "account present" to MFP 100 because the corresponding account information is stored.

When "account present" is returned from PC 400, MFP 100 decides on PC 400 as an access device and generates a sub-workflow to be executed by the access device. MFP 100 then changes the external process in the workflow to a process of transmitting the sub-workflow to the access device and a process of receiving the execution result, and executes the changed workflow. MFP 100 has acquired image data by executing the workflow up to the process immediately before the process of transmitting the sub-workflow to the access device. MFP 100 transmits the image data and the sub-workflow to the access device that is PC 400.

PC 400 receives the sub-workflow and the image data and then executes a process defined by the sub-workflow on the image data. The sub-workflow defines a process of logging into server 300 using account information, a process of requesting server 300 to execute a character recognition process that is an external process, and a process of transmitting data obtained by server 300 executing a character recognition process to MFP 100.

PC 400 transmits the account information to server 300. Server 300 performs authentication based on the account information. If authentication is successful, server 300 permits the login by PC 400 and returns a permission signal to PC 400. PC 400 receives the permission signal for login from server 300 and then transmits the image data input together with the sub-workflow from MFP 100 to server 300. Server 300 receiving the image data executes a character recognition process on the image data and returns the execution result of the character recognition process.

PC 400 transmits the execution result received from server 300 to MFP 100. MFP 100 receives the execution result from PC 400 and then executes the remaining process defined by the workflow on character information of the execution result. In the present embodiment, an email including the character information is generated and transmitted.

Figure 9:
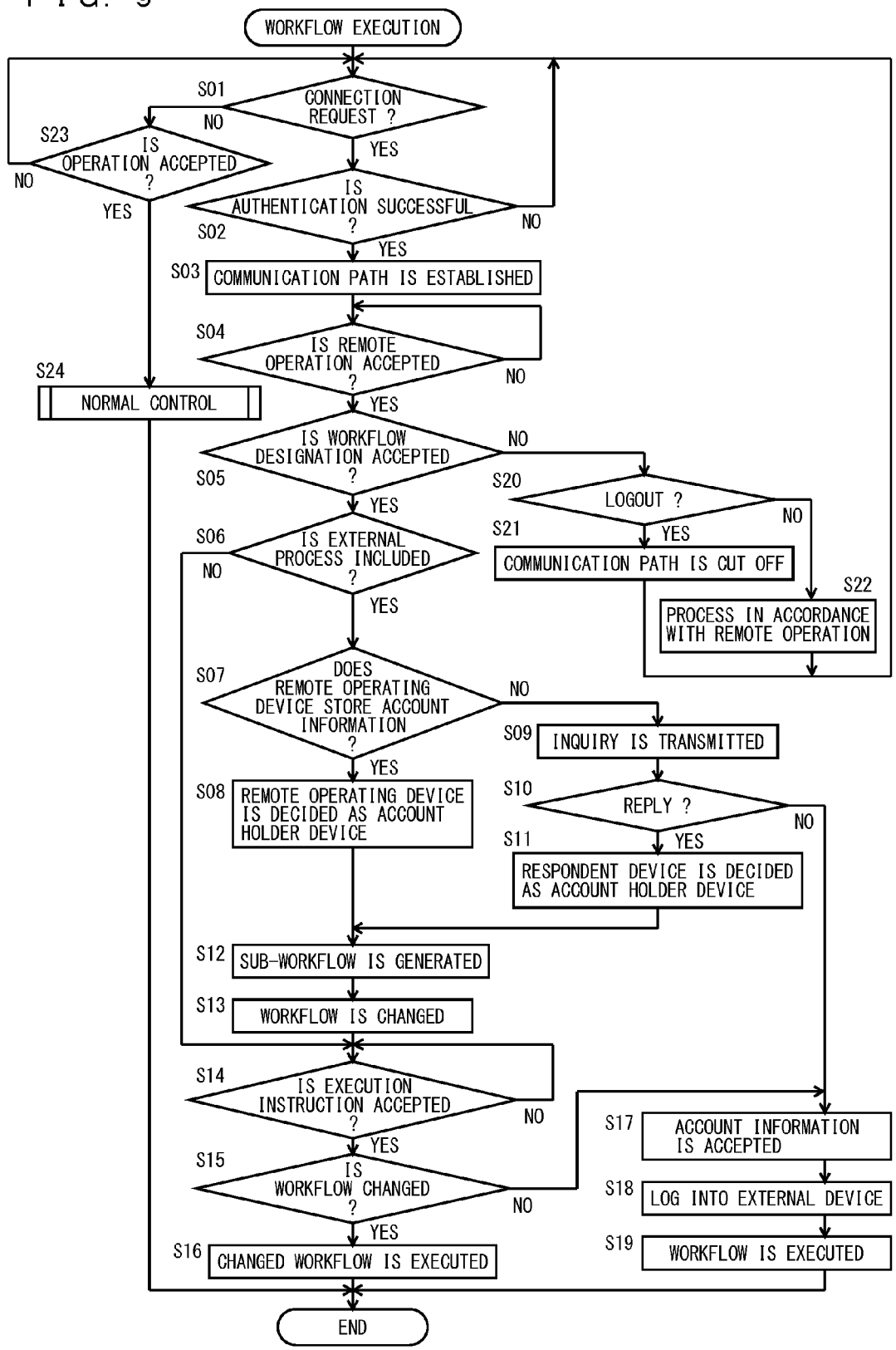
FIG. 9 is a flowchart showing an example of the procedure of a workflow executing process during remote control.

FIG. 9 is a flowchart showing an example of the procedure of a workflow executing process during remote control. The workflow executing process during remote control is a process executed by CPU 111 by CPU 111 of MFP 100 executing a workflow executing program stored in ROM 113, HDD 116, or CD-ROM 119A.

Referring to FIG. 9, CPU 111 determines whether a connection request is received from an external device (step S01). It is determined whether communication I/F unit 112 or short-range wireless communication unit 170 receives a connection request from an external device. If communication I/F unit 112 or short-range wireless communication unit 170 receives a connection request from an external device, the process proceeds to step S02. If not, the process proceeds to step S23.

In step S23, it is determined whether operation unit 163 accepts an operation by a user. If operation unit 163 accepts an operation, the process proceeds to step S24. If not, the process returns to step S01. In step S24, a normal control process is executed, and the process ends. The details of the normal process will be described later.

Here, the user of portable information device 200 allows portable information device 200 to execute a remote operation program for remotely operating MFP 100, by way of example. In this case, portable information device 200 transmits a connection request to MFP 100 through short-range wireless communication unit 210 or wireless LAN I/F 208. Here, portable information device 200 transmits a connection request through short-range wireless communication unit 210, by way of example. In this case, the process proceeds to step S02.

In step S02, it is determined whether authentication is successful. It is determined that authentication is successful if the authentication information received from portable information device 200 is identical with the authentication information stored in advance. If authentication is successful, the process proceeds to step S03. If not, the process returns to step S01. In step S03, a communication path with portable information device 200 is established, and the process proceeds to step S04.

In step S04, the process waits until a remote operation is accepted. If a remote operation is accepted, the process proceeds to step S05. If the communication path established in step S03 is cut off or if a remote operation is not received continuously for a predetermined period, the communication path is cut off, and the process returns to step S01.

In step S05, it is determined whether the accepted remote operation is an operation to designate a workflow. If the operation is to designate a workflow, the process proceeds to step S06. If not, the process proceeds to step S20. In step S20, it is determined whether the accepted remote operation is an operation to log out. If the operation is to log out, the process proceeds to step S21. If not, the process proceeds to step S22. In step S21, the communication path established in step S03 is cut off, and the process returns to step S01. In step S22, a defined process is executed in accordance with the remote operation, and the process returns to step S01.

In step S06, it is determined whether the designated workflow includes an external process. If an external process is included, the process proceeds to step S07. If not, the process proceeds to step S14. CPU 111 reads out the designated workflow and external process information from HDD 116 and extracts the external process from among a plurality of processes included in the workflow. Here, the workflow designated from among workflows stored in HDD 116 defines a document scanning process of scanning a document as a first process, a character recognition process of recognizing characters in the scanned document as a second process, and an email transmitting process of transmitting character data by email as a third process, by way of example. The external process information stored in HDD 116 includes the process identification information of the character recognition process and the service identification information of the service of executing a character recognition process provided by server 300, by way of example. In this case, since the external process information includes the process identification information of the character recognition process and the designated workflow includes a character recognition process, the character recognition process included in the workflow as a second process is specified as an external process. Since the external process information includes the process identification information of the character recognition process and the service identification information of the service of executing a character recognition process provided by server 300, provision of the service of executing a character recognition process specified as an external process by server 300 is specified.

In the next step S07, it is determined whether portable information device 200 that is the remote operating device stores account information for receiving provision of the service of executing a character recognition process provided by server 300. If portable information device 200 stores such account information, the process proceeds to step S08. If not, the process proceeds to step S09. In step S08, portable information device 200 that is the remote operating device is decided as an account holder device, and the process proceeds to step S12.

On the other hand, in step S09, an inquiry is broadcasted through communication I/F unit 112 as to whether account information for receiving provision of the service of executing a character recognition process provided by server 300 is stored. For example, if the user has stored a set of the service identification information of the service of server 300 executing a character recognition process and the account information corresponding to the service into PC 400, PC 400 returns a signal indicating the presence of account information in response to the inquiry about the presence/absence of account information.

In step S10, it is determined whether a reply to the inquiry is received. If a reply is received, the process proceeds to step S11. If not, the process proceeds to step S17. In step S11, the respondent device that makes a reply is decided as an account holder device, and the process proceeds to step S12. If PC 400 replies to the inquiry about account information, PC 400 is decided as an account holder device.

In step S12, a sub-workflow is generated. A sub-workflow for allowing the account holder device decided in step S08 or step S11 to execute the external process is generated. The sub-workflow includes a process of logging into server 300 that provides the service of executing the external process using account information, a process of requesting server 300 to execute a character recognition process that is an external process, and a process of transmitting data obtained by server 300 executing a character recognition process to MFP 100.

In the next step S13, the workflow designated in step S05 is changed. The external process extracted in step S06 in the workflow is replaced by a process of allowing the account holder device to execute the sub-workflow. The workflow in which the external process is replaced by the process of allowing the account holder device to execute the sub-workflow is hereinafter referred to as the changed workflow.

In the next step S14, it is determined whether an instruction to execute the workflow is accepted. The process waits until an instruction to execute is accepted. If an instruction to execute is accepted, the process proceeds to step S15. In step S15, it is determined whether step S13 is executed and the workflow is changed. If the workflow is changed, the process proceeds to step S16. If not, the process proceeds to step S17. In step S16, the changed workflow is executed, and the process ends.

In step S17, account information is accepted. Server 300 is specified as an external device that executes the external process extracted in step S06, and a character recognition process is specified as the service provided by server 300. Therefore, the account information accepted in step S17 is account information for receiving provision of the service of executing a character recognition process at server 300. Specifically, if MFP 100 is remotely operated by portable information device 200, an account input screen received from server 300 is transmitted to portable information device 200, and the account information input by the user to portable information device 200 is accepted. If the user operates operation panel 160, the account input screen received from server 300 appears on display unit 161, and the account information input by the user to operation unit 163 is accepted.

In step S18, the account information accepted in step S17 is used to log into the external device. Here, since server 300 is specified as the external device, the account information accepted in step S17 is used to log into server 300. In the next step S19, the workflow designated in step S05 is executed, and the process ends. When the workflow is executed, server 300 is logged in at a stage when the external process extracted in step S06 is executed. Therefore, server 300 is requested to execute the external process.

Figure 10:
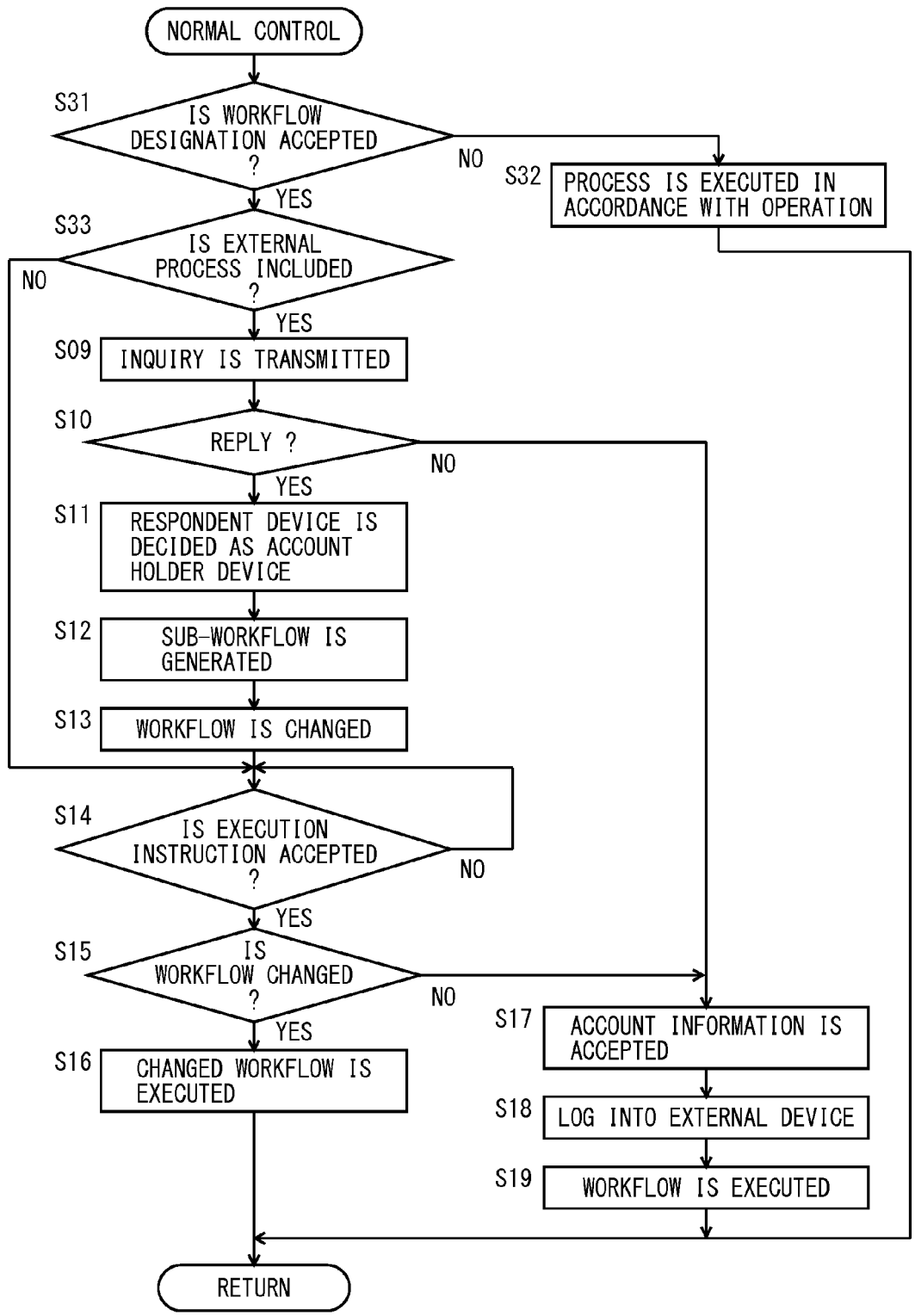
FIG. 10 is a flowchart showing an example of the procedure of a remote control process.

FIG. 10 is a flowchart showing an example of the procedure of a normal control process. The normal control process is a process performed in step S24 in FIG. 9. The same processing as in FIG. 9 is denoted by the same reference signs. In FIG. 9, when the process proceeds to step S24, operation unit 163 has accepted the operation by the user in step S23.

Referring to FIG. 10, CPU 111 determines whether the user's operation accepted by operation unit 163 is an operation to designate a workflow (step S31). If the operation is to designate a workflow, the process proceeds to step S33. If not, the process proceeds to step S32. In step S32, a process is executed in accordance with the operation input by the user, and the process returns to the workflow executing process.

In step S33, it is determined whether the designated workflow includes an external process. If an external process is included, the process proceeds to step S09. If not, the process proceeds to step S14. A character recognition process is specified as an external process, and provision of the service of executing a character recognition process by server 300 is specified, in the same manner as in step S06 shown in FIG. 9. The processing from step S09 to step S17 is the same as the processing shown in FIG. 9, and a description is not repeated here.

As described above, in workflow management system 1 in the present embodiment, MFP 100 functions as a workflow executing device and stores a workflow and external process information in HDD 116. The external process information includes information that defines the kind of service of executing a character recognition process provided by server 300 as a first external device and the service identification information for identifying the service. MFP 100 specifies a character recognition process to be processed by server 300 as an external process from among a plurality of processes defined by the workflow specified by the user, by referring to the external process information, and specifies portable information device 200 as an account holder device (second external device) that stores the account information requested by server 300 in order to allow server 300 to execute a character recognition process. A sub-workflow is then generated which defines a login process of logging into server 300 using the account information, a request process of allowing server 300 to execute a character recognition process, and an execution result output process of transmitting the execution result of the character recognition process by server 300 to MFP 100. The character recognition process in the workflow is then replaced by a workflow transmitting process of transmitting the sub-workflow to the account holder device and an execution result receiving process of receiving the execution result of the external process from the account holder device. The changed workflow is then executed in place of the workflow specified by the user. Therefore, even when the workflow includes a character recognition process that MFP 100 cannot execute, MFP 100 allows server 300 to execute a character recognition process through portable information device 200, thereby executing the workflow. MFP 100 does not have to store account information requested by server 300, thereby preventing other people using MFP 100 from using account information. Security is thus increased.

For example, even the user who does not have account information registered in server 300 can allow MFP 100 to execute a workflow and allow server 300 to execute a character recognition process simply by operating MFP 100. Even in this case, the user who operates MFP 100 does not know the account information stored in the account holder device (second external device). When users who operate MFP 100 are limited by authentication or other processing, even the user who does not have the account information registered in server 300 can allow MFP 100 to execute a workflow and can allow server 300 to execute a character recognition process, on condition that the user is given authority to use MFP 100. The account holder device (second external device) may receive the user identification information of the user who operates MFP 100 from MFP 100 and may return a reply indicating the presence of account information on condition that the user identification information is registered in advance. In this case, on condition that the user permitted to use the account information registered in server 300 operates MFP 100, the user can allow MFP 100 to execute a workflow. Therefore, if the user not permitted to use the account information registered in server 300 operates MFP 100, MFP 100 does not execute a workflow. Therefore, even when a plurality of people use MFP 100, account information can be properly used.

When the user remotely operates MFP 100 using portable information device 200 and specifies a workflow in accordance with a remote operation accepted by portable information device 200, portable information device 200 is specified as an account holder device. Thus, the user who gives an instruction to execute a workflow using portable information device 200 is identical with the user who gives an instruction to allow server 300 to execute an external process. This can prevent other people from using the account information stored in portable information device 200.

MFP 100 executes a process in accordance with a remote operation received from portable information device 200 on condition that authentication of portable information device 200 is successful based on the authentication information transmitted from portable information device 200. Users who can remotely operate MFP 100 using portable information device 200 are thus limited, so that users who can execute workflows are limited.

After accepting the remote operation to execute a workflow by the user who operates portable information device 200, MFP 100 is on standby to be ready for accepting another remote operation from portable information device 200. Therefore, portable information device 200 can accept another operation after the user gives an instruction to execute a workflow. For example, while a workflow is being executed at MFP 100, portable information device 200 can accept another remote operation on MFP 100, and portable information device 200 can execute another application program.

MFP 100 broadcasts a search command to search for a device that holds account information requested by server 300 and specifies a device that replies to the search command as an account holder device. Therefore, for example, PC 400 can be specified as an account holder device from among MFPs 101, 102, and PC 400 that MFP 100 can communicate with. As long as account information requested by server 300 is stored in any of MFPs 101, 102, portable information device 200, and PC 400 that can communicate with MFP 100, MFP 100 is allowed to execute a workflow including an external process.

If no account holder device is specified even with the search command transmitted, in other words, none of MFPs 101, 102, and PC 400 that can communicate with MFP 100 stores account information, MFP 100 allows server 300 to execute an external process using the account information input by the user to operation unit 163 at a stage before the external process is executed. Therefore, the workflow can be executed when the user inputs the account information.

Although workflow management system 1 has been described in the foregoing embodiment, it is needless to say that the present invention can be understood as a workflow management method or a workflow management program that allows the workflow management devices, that is, MFPs 100, 101, 102 to execute the workflow executing process shown in FIG. 9 and FIG. 10.

Although the present invention has been described and illustrated in detail, it is clearly understood that the same is by way of illustration and example only and is not to be taken by way of limitation, the spirit and scope of the present invention being limited only by the terms of the appended claims.

<Notes>

(1) The workflow executing device according to claim 5, wherein the workflow executing step includes a step of executing the specified workflow or the changed workflow in response to acceptance of a remote operation to give an instruction to execute the specified workflow from the remote operating device in the remote control step.

According to this aspect, the workflow or the changed workflow is executed in response to acceptance of a remote operation to give an instruction to execute a workflow from the remote operating device. Therefore, the process of executing the workflow or the changed workflow can be performed concurrently with another process.

What is claimed is:

1. A workflow system comprising a workflow executing device, a first external device, and a second external device,
the workflow executing device comprising
a communication unit to communicate with the first external device and the second external device, and
a controller, the controller of the workflow executing device executing:
a workflow specifying step of specifying a workflow that defines a plurality of processes, wherein at least one of the plurality of processes is an external process to be executed by the first external device;
a workflow executing step of executing the plurality of processes defined by the specified workflow;
an external process specifying step of specifying the external process to be processed by the first external device;
a device specifying step of, when the external process is specified, specifying the second external device that stores user account information requested by the first external device to allow the first external device to execute the external process;
a sub-workflow generating step of generating a sub-workflow that defines a login process of logging into the first external device using the user account information stored in the second external device, a request process of allowing the first external device to execute the external process, and an execution result output process of transmitting an execution result of the external process by the first external device to the workflow executing device; and
a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow,
the workflow executing step including a step of, when the external process is specified in the external process specifying step, executing the workflow changed in the workflow changing step in place of the specified workflow, the first external device comprising
an account information storage unit to store user account information obtained from the second external device, and
a controller, the controller of the first external device executing:
an account information requesting step of requesting user account information from the second device; and
a service providing step of, on condition that account information received in response to the request in the account information requesting step is stored in the account information storage unit, providing a service of executing the external process and returning an execution result to a device that has transmitted the received account information, the second external device comprising
a device-side storage unit that stores user account information, and
a controller,
the controller of the second external device executing a sub-workflow executing step of executing a process defined by the sub-workflow in response to reception of the sub-workflow from the workflow executing device.

2. A workflow executing device capable of executing a workflow,
the workflow executing device comprising
a communication unit to communicate with a first external device and a second external device, and
a controller, the controller executing:
a workflow specifying step of specifying a workflow that defines a plurality of processes, wherein at least one of the plurality of processes is an external process to be executed by the first external device;
a workflow executing step of executing the plurality of processes defined by the specified workflow;
an external process specifying step of specifying the external process to be processed by a first external device;
a device specifying step of, when the external process is specified, specifying the second external device that stores user account information requested by the first external device to allow the first external device to execute the external process;
a sub-workflow generating step of generating a sub-workflow that defines a login process of logging into the first external device using the user account information stored in the second external device, a request process of allowing the first external device to execute the external process, and an execution result output process of transmitting an execution result of the external process by the first external device to the workflow executing device; and
a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow, the workflow executing step including a step of, when the external process is specified in the external process specifying step, executing the workflow changed in the workflow changing step in place of the specified workflow.

3. The workflow executing device according to claim 2, wherein
the controller further executes a remote control step of accepting a remote operation by a remote operating device that the communication unit is communicating with, and executing a process in accordance with the accepted remote operation, and
the device specifying step includes a step of, when a workflow is specified in the workflow specifying step in accordance with the remote operation accepted from the remote operating device in the remote control step, specifying the remote operating device as the second external device on condition that the remote operating device stores the user account information.

4. The workflow executing device according to claim 3, wherein
the remote control step includes
an authentication step of authenticating the remote operating device based on authentication information transmitted from the remote operating device, and
a step of executing a process in accordance with a remote operation accepted from the remote operating device on condition that authentication by the authentication step is successful.

5. The workflow executing device according to claim 3, wherein the remote control step includes a step of switching a state to a standby state to be ready for accepting another remote operation from the remote operating device, after a remote operation of giving an instruction to execute the specified workflow is accepted.

6. The workflow executing device according to claim 2, wherein the device specifying step includes a device search step of transmitting a search command through the communication unit to search for a device that holds user account information requested by the first external device and specifying a device that replies to the search command as the second external device in order to allow the first external device to execute the external process.

7. The workflow executing device according to claim 2, wherein
the controller further executes an account information accepting step of, when the second external device is not specified in the device specifying step, accepting user account information input by a user at a stage before the external process is executed, and
the workflow executing step includes a step of allowing the first external device to execute the external process using the user account information accepted in the account information accepting step.

8. The workflow executing device according to claim 2, wherein
the workflow executing device functions as an image processing apparatus further comprising an image processing unit that processes an image,
the first external device is a server connected to the Internet, and
the second external device is a portable information device carried by a user or a personal computer.

9. A workflow executing method performed in a workflow executing device including a communication unit to communicate with a first external device and a second external device, the method comprising:

a workflow specifying step of specifying a workflow that defines a plurality of processes, wherein at least one of the plurality of processes is an external process to be executed by the first external device;

a workflow executing step of executing the plurality of processes defined by the specified workflow;

an external process specifying step of specifying the external process to be processed by the first external device;

a device specifying step of, when the external process is specified, specifying the second external device that stores user account information requested by the first external device to allow the first external device to execute the external process;

a sub-workflow generating step of generating a sub-workflow that defines a login process of logging into the first external device using the user account information stored in the second external device, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow, the workflow executing step including a step of, when the external process is specified in the external process specifying step, executing the workflow changed in the workflow changing step in place of the specified workflow.

10. The workflow executing method according to claim 9, further comprising a remote control step of accepting a remote operation by a remote operating device that the communication unit is communicating with, and executing a process in accordance with the accepted remote operation, wherein the device specifying step includes a step of, when a workflow is specified in the workflow specifying step in accordance with the remote operation accepted from the remote operating device in the remote control step, specifying the remote operating device as the second external device on condition that the remote operating device stores the user account information.

11. The workflow executing method according to claim 10, wherein
the remote control step includes
an authentication step of authenticating the remote operating device based on authentication information transmitted from the remote operating device, and
a step of executing a process in accordance with a remote operation accepted from the remote operating device on condition that authentication by the authentication step is successful.

12. The workflow executing method according to claim 10, wherein the remote control step includes a step of switching a state to a standby state to be ready for accepting another remote operation from the remote operating device, after a remote operation of giving an instruction to execute the specified workflow is accepted.

13. The workflow executing method according to claim 9, wherein the device specifying step includes a device search step of transmitting a search command through the communication unit to search for a device that holds user account information requested by the first external device and specifying a device that replies to the search command as the second external device in order to allow the first external device to execute the external process.

14. The workflow executing method according to claim 9, further comprising an account information accepting step of, when the second external device is not specified in the device specifying step, accepting user account information input by a user at a stage before the external process is executed, wherein the workflow executing step includes a step of allowing the first external device to execute the external process using the user account information accepted in the account information accepting step.

15. The workflow executing method according to claim 9, wherein
the workflow executing device functions as an image processing apparatus further comprising an image processing unit that processes an image,
the first external device is a server connected to the Internet, and
the second external device is a portable information device carried by a user or a personal computer.

16. A non-transitory computer-readable recording medium encoded with a workflow executing program executed in a computer that controls a workflow executing device including a communication unit to communicate with a first external device and a second external device, the program causing the computer to execute:

a workflow specifying step of specifying a workflow that defines a plurality of processes, wherein at least one of the plurality of processes is an external process to be executed by the first external device;

a workflow executing step of executing the plurality of processes defined by the specified workflow;

an external process specifying step of specifying the external process to be processed by a first external device;

a device specifying step of, when the external process is specified, specifying the second external device that stores user account information requested by the first external device to allow the first external device to execute the external process;

a sub-workflow generating step of generating a sub-workflow that defines a login process of logging into the first external device using the user account information stored in the second external device, a request process of allowing the first external device to execute the external process, and an execution result output process of transmitting an execution result of the external process by the first external device to the workflow executing device; and a workflow changing step of changing the external process in the workflow to a workflow transmitting process of transmitting the sub-workflow to the second external device through the communication unit and an execution result receiving process of receiving the execution result of the external process from the second external device through the communication unit, in order to allow the second external device to execute the generated sub-workflow, the workflow executing step including a step of, when the external process is specified in the external process specifying step, executing the workflow changed in the workflow changing step in place of the specified workflow.

17. The non-transitory computer-readable recording medium encoded with a workflow executing program according to claim 16, wherein
the program further causes the computer to execute a remote control step of accepting a remote operation by a remote operating device that the communication unit is communicating with, and executing a process in accordance with the accepted remote operation, and
the device specifying step includes a step of, when a workflow is specified in the workflow specifying step in accordance with the remote operation accepted from the remote operating device in the remote control step, specifying the remote operating device as the second external device on condition that the remote operating device stores the user account information.

18. The non-transitory computer-readable recording medium encoded with a workflow executing program according to claim 17, wherein
the remote control step includes
an authentication step of authenticating the remote operating device based on authentication information transmitted from the remote operating device, and
a step of executing a process in accordance with a remote operation accepted from the remote operating device on condition that authentication by the authentication step is successful.

19. The non-transitory computer-readable recording medium encoded with a workflow executing program according to claim 17, wherein the remote control step includes a step of switching a state to a standby state to be ready for accepting another remote operation from the remote operating device, after a remote operation of giving an instruction to execute the specified workflow is accepted.

20. The non-transitory computer-readable recording medium encoded with a workflow executing program according to claim 16, wherein the device specifying step includes a device search step of transmitting a search command through the communication unit to search for a device that holds user account information requested by the first external device and specifying a device that replies to the search command as the second external device in order to allow the first external device to execute the external process.

21. The non-transitory computer-readable recording medium encoded with a workflow executing program according to claim 16, wherein
the program further causes the computer to execute an account information accepting step of, when the second external device is not specified in the device specifying step, accepting user account information input by a user at a stage before the external process is executed, and
the workflow executing step includes a step of allowing the first external device to execute the external process using the user account information accepted in the account information accepting step.

22. The non-transitory computer-readable recording medium encoded with a workflow executing program according to claim 16, wherein
the workflow executing device functions as an image processing apparatus further comprising an image processing unit that processes an image,
the first external device is a server connected to the Internet, and
the second external device is a portable information device carried by a user or a personal computer.

* * * * *